US009215326B2

(12) United States Patent
Brahm et al.

(10) Patent No.: US 9,215,326 B2
(45) Date of Patent: *Dec. 15, 2015

(54) SYSTEMS AND METHODS FOR CALL PROCESSING

(71) Applicant: Callwave Communications, LLC, Brookline, MA (US)

(72) Inventors: David J. Brahm, Santa Barbara, CA (US); David S. Trandal, Santa Barbara, CA (US); Robert F. Smith, Newbury Park, CA (US)

(73) Assignee: Callwave Communications, LLC, Brookline, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/290,618

(22) Filed: May 29, 2014

(65) Prior Publication Data

US 2014/0269447 A1 Sep. 18, 2014

Related U.S. Application Data

(63) Continuation of application No. 13/922,065, filed on Jun. 19, 2013, now Pat. No. 8,744,061, which is a continuation of application No. 13/295,830, filed on Nov. 14, 2011, now Pat. No. 8,472,604, which is a (Continued)

(51) Int. Cl.
*H04M 3/42* (2006.01)
*H04M 3/54* (2006.01)

(Continued)

(52) U.S. Cl.
CPC ............ *H04M 3/543* (2013.01); *H04M 3/4281* (2013.01); *H04M 3/436* (2013.01);

(Continued)

(58) Field of Classification Search
CPC ..................... H04M 3/42365; H04M 3/436
USPC ............... 379/215.01, 142.08, 88.23, 211.01
See application file for complete search history.

(56) References Cited

U.S. PATENT DOCUMENTS

| 3,936,613 A | 2/1976 | Nishigori et al. |
| 3,956,595 A | 5/1976 | Sobanski |

(Continued)

FOREIGN PATENT DOCUMENTS

| CA | 1329852 | 5/1994 |
| EP | 1 120 954 | 8/2001 |

(Continued)

OTHER PUBLICATIONS

Article: Johnson, Dave; "Now You're Talking-voice-response systems for home offices—Product Information"; *Home Office Computing*: http://www.findarticles.com: Feb. 1999.

(Continued)

*Primary Examiner* — Creighton Smith
(74) *Attorney, Agent, or Firm* — Knobbe, Martens, Olson & Bear LLP

(57) ABSTRACT

The present invention provides flexible, user-definable call screening processes. The user can optionally define to which telecommunication terminals a screened call is to be broadcast to and under what conditions. An incoming call is forwarded to a call management system that asks the caller to leave a voice message. The call management system selectively couples the call to a POTS line or a VoIP-capable device so that the user can listen to the incoming message and thereby screen the incoming call. Based on the screening, the user can instruct the call management system to connect the caller to the user.

30 Claims, 7 Drawing Sheets

Related U.S. Application Data continuation of application No. 12/616,025, filed on Nov. 10, 2009, now Pat. No. 8,064,588, which is a continuation of application No. 11/374,390, filed on Mar. 13, 2006, now Pat. No. 7,636,428, which is a continuation of application No. 10/439,601, filed on May 16, 2003, now Pat. No. 7,103,167.

(60) Provisional application No. 60/382,257, filed on May 20, 2002.

(51) Int. Cl.
*H04M 3/428* (2006.01)
*H04M 3/436* (2006.01)
*H04M 7/00* (2006.01)
*H04M 3/533* (2006.01)

(52) U.S. Cl.
CPC ........ *H04M7/0057* (2013.01); *H04M 3/53308* (2013.01); *H04M 2203/2011* (2013.01); *H04M 2203/4563* (2013.01); *H04M 2207/203* (2013.01)

(56) References Cited

U.S. PATENT DOCUMENTS

| | | |
|---|---|---|
| 4,009,337 A | 2/1977 | Sakai et al. |
| 4,022,983 A | 5/1977 | Braun et al. |
| 4,485,470 A | 11/1984 | Reali |
| 4,723,273 A | 2/1988 | Diesel et al. |
| 4,736,405 A | 4/1988 | Akiyama |
| 4,809,321 A | 2/1989 | Morganstein et al. |
| 4,893,336 A | 1/1990 | Wuthnow |
| 4,901,340 A | 2/1990 | Parker et al. |
| 4,994,926 A | 2/1991 | Gordon et al. |
| 5,040,208 A | 8/1991 | Jolissaint |
| 5,046,087 A | 9/1991 | Sakai |
| 5,283,824 A | 2/1994 | Shaw |
| 5,291,302 A | 3/1994 | Gordon et al. |
| 5,339,076 A | 8/1994 | Jiang |
| 5,351,208 A | 9/1994 | Jiang |
| 5,353,331 A | 10/1994 | Emery et al. |
| 5,361,295 A | 11/1994 | Solomon et al. |
| 5,379,351 A | 1/1995 | Fandrianto et al. |
| 5,384,831 A | 1/1995 | Creswell et al. |
| 5,404,537 A | 4/1995 | Olnowich et al. |
| 5,432,845 A | 7/1995 | Burd et al. |
| 5,434,908 A | 7/1995 | Klein |
| 5,440,620 A | 8/1995 | Slusky |
| 5,459,584 A | 10/1995 | Gordon et al. |
| 5,467,388 A | 11/1995 | Redd, Jr. et al. |
| 5,471,519 A | 11/1995 | Howe et al. |
| 5,475,748 A | 12/1995 | Jones |
| 5,487,111 A | 1/1996 | Slusky |
| 5,502,762 A | 3/1996 | Andrew et al. |
| 5,526,524 A | 6/1996 | Madduri |
| 5,533,102 A | 7/1996 | Robinson et al. |
| 5,533,106 A | 7/1996 | Blumhardt |
| 5,548,636 A | 8/1996 | Bannister et al. |
| 5,577,111 A | 11/1996 | Iida et al. |
| 5,583,918 A | 12/1996 | Nakagawa |
| 5,594,813 A | 1/1997 | Fandrianto et al. |
| 5,619,557 A | 4/1997 | Van Berkum |
| 5,640,677 A | 6/1997 | Karlsson |
| 5,651,054 A | 7/1997 | Dunn et al. |
| 5,703,930 A | 12/1997 | Miska et al. |
| 5,751,795 A | 5/1998 | Hassler et al. |
| 5,761,280 A | 6/1998 | Noonen et al. |
| 5,774,067 A | 6/1998 | Olnowich et al. |
| 5,784,444 A | 7/1998 | Snyder et al. |
| 5,790,712 A | 8/1998 | Fandrianto et al. |
| 5,793,984 A | 8/1998 | Helman |
| 5,802,160 A | 9/1998 | Kugell et al. |
| 5,805,587 A | 9/1998 | Norris et al. |
| 5,809,128 A | 9/1998 | McMullin |
| 5,812,551 A | 9/1998 | Tsukazoe et al. |
| 5,825,867 A | 10/1998 | Epler et al. |
| 5,832,060 A | 11/1998 | Corlett et al. |
| 5,835,573 A | 11/1998 | Dee et al. |
| 5,862,208 A | 1/1999 | MeLampy et al. |
| 5,864,612 A | 1/1999 | Strauss et al. |
| 5,894,504 A | 4/1999 | Alfred et al. |
| 5,894,595 A | 4/1999 | Foladare et al. |
| 5,898,898 A | 4/1999 | Kleck |
| 5,901,209 A | 5/1999 | Tannenbaum et al. |
| 5,901,248 A | 5/1999 | Fandrianto et al. |
| 5,903,636 A | 5/1999 | Malik |
| 5,910,827 A | 6/1999 | Kwan et al. |
| 5,912,948 A | 6/1999 | Nelson et al. |
| 5,926,208 A | 7/1999 | Noonen et al. |
| 5,934,640 A | 8/1999 | Hall et al. |
| 5,946,381 A | 8/1999 | Danne et al. |
| 5,946,386 A | 8/1999 | Rogers et al. |
| 5,960,064 A | 9/1999 | Foladare et al. |
| 5,960,073 A | 9/1999 | Kikinis et al. |
| 5,963,629 A | 10/1999 | Jung |
| 5,966,165 A | 10/1999 | Eddington |
| 5,978,014 A | 11/1999 | Martin et al. |
| 5,982,459 A | 11/1999 | Fandrianto et al. |
| 5,991,367 A | 11/1999 | Robuck |
| 5,991,394 A | 11/1999 | Dezonno et al. |
| 5,995,594 A | 11/1999 | Shaffer et al. |
| 5,995,603 A | 11/1999 | Anderson |
| 5,999,806 A | 12/1999 | Kaplan et al. |
| 6,014,436 A | 1/2000 | Florence et al. |
| 6,016,524 A | 1/2000 | Kleck |
| 6,023,503 A | 2/2000 | Schneider et al. |
| 6,026,097 A | 2/2000 | Voois et al. |
| 6,031,896 A | 2/2000 | Gardell et al. |
| 6,032,051 A | 2/2000 | Hall et al. |
| 6,034,956 A | 3/2000 | Olnowich et al. |
| 6,035,031 A | 3/2000 | Silverman |
| 6,038,291 A | 3/2000 | Cannon et al. |
| 6,041,103 A | 3/2000 | La Porta et al. |
| 6,044,059 A | 3/2000 | Olnowich |
| 6,055,430 A | 4/2000 | Cooper et al. |
| 6,061,333 A | 5/2000 | Joe et al. |
| 6,075,554 A | 6/2000 | Andrews et al. |
| 6,078,350 A | 6/2000 | Davis |
| 6,078,581 A | 6/2000 | Shtivelman et al. |
| 6,091,808 A | 7/2000 | Wood et al. |
| 6,100,873 A | 8/2000 | Bayless et al. |
| 6,101,249 A | 8/2000 | Weber |
| 6,104,800 A | 8/2000 | Benson |
| 6,104,836 A | 8/2000 | Buckley et al. |
| 6,108,027 A | 8/2000 | Andrews et al. |
| 6,119,178 A | 9/2000 | Martin et al. |
| 6,121,998 A | 9/2000 | Voois et al. |
| 6,122,347 A | 9/2000 | Borland |
| 6,124,882 A | 9/2000 | Voois et al. |
| 6,130,935 A | 10/2000 | Shaffer et al. |
| 6,133,940 A | 10/2000 | Noonen et al. |
| 6,134,315 A | 10/2000 | Galvin |
| 6,137,870 A | 10/2000 | Scherer |
| 6,144,644 A | 11/2000 | Bajzath et al. |
| 6,144,667 A | 11/2000 | Doshi et al. |
| 6,160,503 A | 12/2000 | Andrews et al. |
| 6,160,881 A | 12/2000 | Beyda et al. |
| 6,163,335 A | 12/2000 | Barraclough |
| 6,167,127 A | 12/2000 | Smith et al. |
| 6,169,795 B1 | 1/2001 | Dunn et al. |
| 6,169,796 B1 | 1/2001 | Bauer et al. |
| 6,175,622 B1 | 1/2001 | Chiniwala et al. |
| 6,178,183 B1 | 1/2001 | Buskirk, Jr. |
| 6,181,691 B1 | 1/2001 | Markgraf et al. |
| 6,188,429 B1 | 2/2001 | Martin et al. |
| 6,205,177 B1 | 3/2001 | Girod et al. |
| 6,208,372 B1 | 3/2001 | Barraclough |
| 6,208,378 B1 | 3/2001 | Barraclough et al. |
| 6,208,638 B1 | 3/2001 | Rieley et al. |
| 6,211,801 B1 | 4/2001 | Gird |
| 6,212,261 B1 | 4/2001 | Meubus et al. |
| 6,215,425 B1 | 4/2001 | Andrews et al. |

(56) References Cited

U.S. PATENT DOCUMENTS

| | | |
|---|---|---|
| 6,215,515 B1 | 4/2001 | Voois et al. |
| 6,225,923 B1 | 5/2001 | Andrews |
| 6,226,031 B1 | 5/2001 | Barraclough et al. |
| 6,230,009 B1 | 5/2001 | Holmes et al. |
| 6,239,847 B1 | 5/2001 | Deierling |
| 6,243,129 B1 | 6/2001 | Deierling |
| 6,243,378 B1 | 6/2001 | Olnowich |
| 6,243,398 B1 | 6/2001 | Kahane et al. |
| 6,249,318 B1 | 6/2001 | Girod et al. |
| 6,253,249 B1 | 6/2001 | Belzile |
| 6,278,704 B1 | 8/2001 | Creamer et al. |
| 6,282,272 B1 | 8/2001 | Noonen et al. |
| 6,300,979 B1 | 10/2001 | Parkinson et al. |
| 6,301,607 B2 | 10/2001 | Barraclough et al. |
| 6,304,565 B1 | 10/2001 | Ramamurthy |
| 6,310,939 B1 | 10/2001 | Varney |
| 6,337,858 B1 | 1/2002 | Petty et al. |
| 6,337,898 B1 | 1/2002 | Gordon |
| 6,350,066 B1 | 2/2002 | Bobo, II |
| 6,353,660 B1 | 3/2002 | Burger |
| 6,353,663 B1 | 3/2002 | Stevens et al. |
| 6,356,294 B1 | 3/2002 | Martin et al. |
| 6,363,414 B1 | 3/2002 | Nicholls et al. |
| 6,366,659 B1 | 4/2002 | Koponen et al. |
| 6,366,661 B1 | 4/2002 | Devillier et al. |
| 6,373,517 B1 | 4/2002 | Davis et al. |
| 6,374,102 B1 | 4/2002 | Brachman et al. |
| 6,381,282 B1 | 4/2002 | Kwan et al. |
| 6,381,459 B1 | 4/2002 | Gervens et al. |
| 6,389,117 B1 | 5/2002 | Gross et al. |
| 6,404,361 B2 | 6/2002 | Andrews et al. |
| 6,404,776 B1 | 6/2002 | Voois et al. |
| 6,404,860 B1 | 6/2002 | Casellini |
| 6,405,035 B1 | 6/2002 | Singh |
| 6,411,601 B1 | 6/2002 | Shaffer et al. |
| 6,411,692 B1 | 6/2002 | Scherer |
| 6,411,805 B1 | 6/2002 | Becker et al. |
| 6,430,282 B1 | 8/2002 | Bannister et al. |
| 6,430,289 B1 | 8/2002 | Liffick |
| 6,438,216 B1 | 8/2002 | Aktas |
| 6,438,222 B1 | 8/2002 | Burg |
| 6,441,842 B1 | 8/2002 | Fandrianto et al. |
| 6,445,694 B1 | 9/2002 | Swartz |
| 6,477,246 B1 | 11/2002 | Dolan et al. |
| 6,483,532 B1 | 11/2002 | Girod |
| 6,496,569 B2 | 12/2002 | Pelletier et al. |
| 6,496,576 B2 | 12/2002 | Tanaka et al. |
| 6,501,750 B1 | 12/2002 | Shaffer et al. |
| 6,505,163 B1 | 1/2003 | Zhang et al. |
| 6,510,162 B1 | 1/2003 | Fijolek et al. |
| 6,510,417 B1 | 1/2003 | Woods et al. |
| 6,512,930 B2 | 1/2003 | Sandegren |
| 6,519,258 B1 | 2/2003 | Tsukazoe et al. |
| 6,529,587 B1 | 3/2003 | Cannon et al. |
| 6,539,084 B1 | 3/2003 | Long |
| 6,545,589 B1 | 4/2003 | Fuller et al. |
| 6,546,087 B2 | 4/2003 | Shaffer et al. |
| 6,549,612 B2 | 4/2003 | Gifford et al. |
| 6,553,222 B1 | 4/2003 | Weiss |
| 6,560,284 B1 | 5/2003 | Girod et al. |
| 6,564,264 B1 | 5/2003 | Creswell et al. |
| 6,564,321 B2 | 5/2003 | Bobo, II |
| 6,567,505 B1 | 5/2003 | Omori et al. |
| 6,574,319 B2 | 6/2003 | Latter et al. |
| 6,574,328 B1 | 6/2003 | Wood et al. |
| 6,603,846 B1 | 8/2003 | Cannon et al. |
| 6,621,892 B1 | 9/2003 | Banister et al. |
| 6,625,258 B1 | 9/2003 | Ram et al. |
| 6,643,034 B1 | 11/2003 | Gordon et al. |
| 6,658,100 B1 | 12/2003 | Lund |
| 6,661,785 B1 | 12/2003 | Zhang et al. |
| 6,661,886 B1 | 12/2003 | Huart et al. |
| 6,662,232 B1 | 12/2003 | Nicholls et al. |
| 6,677,987 B1 | 1/2004 | Girod |
| 6,678,735 B1 | 1/2004 | Orton et al. |
| 6,690,672 B1 | 2/2004 | Klein |
| 6,690,785 B1 | 2/2004 | Stelter et al. |
| 6,693,897 B1 | 2/2004 | Huang |
| 6,748,058 B1 | 6/2004 | Schwend et al. |
| 6,751,299 B1 | 6/2004 | Brown et al. |
| 6,775,370 B2 | 8/2004 | Burg |
| 6,782,088 B1 | 8/2004 | Gabara |
| 6,785,021 B1 | 8/2004 | Gordon et al. |
| 6,792,094 B1 | 9/2004 | Kirkpatrick |
| 6,807,231 B1 | 10/2004 | Wiegand et al. |
| 6,816,481 B1 | 11/2004 | Adams et al. |
| 6,857,074 B2 | 2/2005 | Bobo, II |
| 6,879,723 B1 | 4/2005 | Helman |
| 6,898,275 B2 | 5/2005 | Dolan et al. |
| 6,937,699 B1 | 8/2005 | Schuster et al. |
| 6,937,713 B1 | 8/2005 | Kung et al. |
| 6,956,941 B1 | 10/2005 | Duncan et al. |
| 6,965,644 B2 | 11/2005 | Fandrianto et al. |
| 6,968,174 B1 | 11/2005 | Trandal et al. |
| 7,003,087 B2 | 2/2006 | Spencer et al. |
| 7,006,455 B1 | 2/2006 | Fandrianto et al. |
| 7,020,255 B2 | 3/2006 | Gruchala et al. |
| 7,035,890 B2 | 4/2006 | Fandrianto et al. |
| 7,035,935 B1 | 4/2006 | Voois et al. |
| 7,043,232 B2 | 5/2006 | Pelaez et al. |
| 7,092,379 B1 | 8/2006 | Singh et al. |
| 7,103,167 B2 | 9/2006 | Brahm et al. |
| 7,120,143 B1 | 10/2006 | Martin et al. |
| 7,120,238 B1 | 10/2006 | Bednarz et al. |
| 7,124,165 B1 | 10/2006 | Barraclough et al. |
| 7,190,773 B1 | 3/2007 | D'Silva et al. |
| 7,194,080 B2 | 3/2007 | Worsham et al. |
| 7,202,884 B1 | 4/2007 | Barraclough |
| 7,209,964 B2 | 4/2007 | Dugan et al. |
| 7,213,073 B1 | 5/2007 | Slavin |
| 7,218,721 B1 | 5/2007 | Vincent et al. |
| 7,224,774 B1 | 5/2007 | Brown et al. |
| 7,242,680 B2 | 7/2007 | Gallant |
| 7,245,612 B2 | 7/2007 | Petty et al. |
| 7,251,317 B1 | 7/2007 | Robbins et al. |
| 7,254,219 B1 | 8/2007 | Hansen et al. |
| 7,263,178 B1 | 8/2007 | Brothers et al. |
| 7,272,553 B1 | 9/2007 | Chrissan et al. |
| 7,283,813 B1 | 10/2007 | Hamanaga et al. |
| 7,339,604 B1 | 3/2008 | Barraclough et al. |
| 7,388,949 B2 | 6/2008 | Contractor et al. |
| 7,394,803 B1 | 7/2008 | Petit-Huguenin et al. |
| 7,397,910 B2 | 7/2008 | Dolan et al. |
| 7,412,050 B2 | 8/2008 | Renner et al. |
| 7,426,267 B1 | 9/2008 | Caseau |
| 7,433,454 B2 | 10/2008 | Watanabe |
| 7,433,679 B2 | 10/2008 | Lee et al. |
| 7,526,076 B2 | 4/2009 | Koch |
| 7,606,221 B2 | 10/2009 | Artru et al. |
| 7,636,428 B2 | 12/2009 | Brahm et al. |
| 7,688,958 B2 | 3/2010 | Dolan et al. |
| 7,760,867 B2 | 7/2010 | Walker et al. |
| 7,822,188 B1 | 10/2010 | Kirchhoff et al. |
| 8,000,455 B1 | 8/2011 | Van Haaften et al. |
| 8,041,604 B1 | 10/2011 | Glaser |
| 8,064,588 B2 | 11/2011 | Brahm et al. |
| 8,069,205 B1 | 11/2011 | Voois et al. |
| 8,081,740 B2 | 12/2011 | Reynolds et al. |
| 8,351,591 B2 | 1/2013 | Kirchhoff et al. |
| 8,472,604 B2 | 6/2013 | Brahm et al. |
| 2002/0010616 A1 | 1/2002 | Itzhaki |
| 2002/0067816 A1 | 6/2002 | Bushnell |
| 2002/0097710 A1 | 7/2002 | Burg |
| 2002/0176404 A1 | 11/2002 | Girard |
| 2003/0003915 A1 | 1/2003 | Foster et al. |
| 2003/0021403 A1 | 1/2003 | Jones |
| 2003/0039339 A1 | 2/2003 | Luehrig et al. |
| 2003/0063731 A1 | 4/2003 | Woodring |
| 2003/0108172 A1 | 6/2003 | Petty et al. |
| 2003/0108178 A1 | 6/2003 | Nguyen et al. |
| 2003/0123629 A1 | 7/2003 | Hussain et al. |
| 2003/0128691 A1 | 7/2003 | Bergman et al. |
| 2003/0156700 A1 | 8/2003 | Brown et al. |
| 2004/0028203 A1 | 2/2004 | Wurster et al. |

(56) References Cited

U.S. PATENT DOCUMENTS

| | | |
|---|---|---|
| 2004/0073566 A1 | 4/2004 | Trivedi |
| 2004/0105536 A1 | 6/2004 | Williams |
| 2004/0120478 A1 | 6/2004 | Reynolds et al. |
| 2004/0141594 A1 | 7/2004 | Brunson et al. |
| 2004/0141598 A1 | 7/2004 | Moss et al. |
| 2004/0190706 A1 | 9/2004 | Fleischer, III et al. |
| 2004/0196867 A1 | 10/2004 | Ejzak et al. |
| 2004/0218743 A1 | 11/2004 | Hussain et al. |
| 2004/0247105 A1 | 12/2004 | Mullis et al. |
| 2004/0258220 A1 | 12/2004 | Levine et al. |
| 2005/0053216 A1 | 3/2005 | Spencer et al. |
| 2005/0111653 A1 | 5/2005 | Joyce et al. |
| 2005/0123118 A1 | 6/2005 | Terry et al. |
| 2005/0152525 A1 | 7/2005 | Kent et al. |
| 2005/0207432 A1 | 9/2005 | Velez-Rivera et al. |
| 2005/0207556 A1 | 9/2005 | Gonzalez et al. |
| 2005/0215229 A1 | 9/2005 | Cheng |
| 2005/0265322 A1 | 12/2005 | Hester |
| 2006/0013374 A1 | 1/2006 | Fleischer, III et al. |
| 2006/0077957 A1 | 4/2006 | Reddy et al. |
| 2006/0239429 A1 | 10/2006 | Koch et al. |
| 2006/0276193 A1 | 12/2006 | Itzkovitz et al. |
| 2008/0219424 A1 | 9/2008 | Moss et al. |
| 2009/0052647 A1 | 2/2009 | Wood et al. |
| 2010/0202601 A1 | 8/2010 | Frank |
| 2012/0294303 A1 | 11/2012 | Bossemeyer et al. |
| 2013/0097664 A1 | 4/2013 | Herz et al. |

FOREIGN PATENT DOCUMENTS

| | | |
|---|---|---|
| JP | 10-513632 | 12/1998 |
| JP | 11-506292 | 6/1999 |
| JP | 2001-168989 | 6/2001 |
| WO | WO 97/26749 | 7/1997 |
| WO | WO 00/60840 | 10/2000 |
| WO | WO 01/76210 | 10/2001 |

OTHER PUBLICATIONS

Communication pursuant to Article 94(3) EPC, EP application No. 03731252.7, dated Jun. 3, 2009; 6 pages.

International Search Report, PCT application No. PCT/US03/15807, dated May 19, 2003, 7 pages.

Supplementary European Search Report, EP application No. 03731252.7, dated Jun. 6, 2006, 3 pages.

Defendants' Preliminary Invalidity Contentions Relating to the Call Processing Track, in the United States District Court, for the District of Delaware, *Callwave Communicates, Inc.*, v. *AT&T Mobility, LLC, and Google, Inc.*, C.A. No. 12-1701-RGA, *Callwave Communications, LLC*, v. *Sprint Spectrum L.P., Sprint Communications Co., L.P., and Google, Inc.*, C.A. No. 12-1702-RGA, *Callwave Communications, LLC*, v. *Verizon Services Corp., Cellco Partnership, d.b.a. Verizon Wireless, and Google, Inc.*, C.A. No. 12-1704-RGA, and *Broadsoft, Inc.*, v. *Callwave Communications, Inc.*, Case No. 1:13-cv-00711-RGA, dated Jun. 23, 2014.

Brusilovsky et al., "A Proposal for Internet Call Waiting Service using SIP", Nov. 1998, http://tools.ietf.org/id/draft-ietf-pint-icw-00.txt, downloaded Jun. 16, 2014, Bates Nos. DEF-CP-INV-00001285—DEF-CP-INV-00001296.

Rizzetto et al., "A Voice Over IP Service Architecture for Integrated Communications", *IEEE Internet Computing*, pp. 53-62, May/Jun. 1999, Bates Nos. DEF-CP-INV-00001297—DEF-CP-INV-00001307.

Ambrosch et al., "The Intelligent Network", A Joint Study by Bell Atlantic, IBM and Siemens, 1989, Bates Nos. DEF-CP-INV-00001308—DEF-CP-INV-00001611.

Del Pozo, Inmaculada Espigares "An Implementation of the Internet Call Waiting Service using SIP," Helsinki University of Technology, Dec. 1999, Bates Nos. DEF-CP-INV-00001612—DEF-CP-INV-00001698.

Bellamy, John, "Digital Telephony, Second Edition", Wiley Series in Telecommunications, John Wiley, & Sons, Inc., 1991, Bates Nos. DEF-CP-INV-00001699—DEF-CP-INV-00002289.

Pepper et al., "Bellcore's CallManager System", Proceedings Third IEEE Workshop on Interactive Voice Technology for Telecommunications Applications, Sep. 1-Oct. 1, 1996, Bates Nos. DEF-CP-INV-00002290—DEF-CP-INV-00002294.

Cameron et al., "A Feature Interaction Benchmark for IN and Beyond", Mar. 1993, Bates Nos. DEF-CP-INV-00002295—DEF-CP-INV-00002317.

"Intelligent Networks," edited by Jarmo Harju et al., Chapman & Hall, 1995, Proceedings of the IFIP Workshop on Intelligent Networks 1994, Bates Nos. DEF-CP-INV-00002318—DEF-CP-INV-00002620.

Schulzrinne et al., "Internet Telephony: architecture and protocols—an IETF perspective," *Computer Networks* 31 pp. 237-255 (1999), Bates Nos. DEF-CP-INV-00002621—DEF-CP-INV-00002639.

Wedlund Ericsson et al., "Mobility Support Using SIP," 1999, Bats Nos. DEF-CP-INV-00002640—DEF-CP-INV-00002646.

Schulzrinne, Henning, "Voice Communication Across the Internet: A Network Voice Terminal," Jul. 29, 1992, Bates Nos. DEF-CP-INV-00002647—DEF-CP-INV-00002680.

Schulzrinne et al., "Signaling for Internet Telephony," Jan. 31, 1998, Bates Nos. DEF-CP-INV-00002723—DEF-CP-INV-00002749.

Schulzrinne, Henning, "SIP—Signaling for Internet Telephony and Conferencing," Berkeley Multimedia, Interfaces and Graphics Seminar, Nov. 25, 1998, Bates Nos. DEF-CP-INV-00002750—DEF-CP-INV-00002798.

Sparks, R., "SIP Call Control—Transfer," Jul. 18, 2001, Bates Nos. DEF-CP-INV-00002799—DEF-CP-INV-00002815.

Schulzrinne et al., "The Session Initiation Protocol: Providing Advanced Telephone Services Across the Internet," Sep. 13, 1998, Bates Nos. DEF-CP-INV-00002816—DEF-CP-INV-00002838.

Handley et al., "SIP: Session Initiation Protocol," Dec. 2, 1996, www.cs.columbia.edu/sip/drafts/mmusic/draft-ietf-mmusic-sip-01.txt, Bates Nos. DEF-CP-INV-00002839—DEF-CP-INV-00002868.

Handley et al., "SIP: Session Initiation Protocol," Mar. 1999, http://www.ietf.org/rfc/rfc2543.txt, Bates Nos. DEF-CP-INV-00002869—DEF-CP-INV-00003019 .

Stallings, William, "ISDN and Broadband," $2^{nd}$ Edition, Macmillan Publishing Co., 1992, Bates Nos. DEF-CP-INV-00003020—DEF-CP-INV-00003195.

Tanenbaum, Andrew S., "Computer Networks," $3^{rd}$ Edition, Prentice Hall PTR, 1996, Bates Nos. DEF-CP-INV-00003196—DEF-CP-INV-00004029.

Sparks, R., "The Refer Method," Jul. 18, 2001, Bates Nos. DEF-CP-INV-00004030—DEF-CP-INV-00004043.

Dalgic et al, "True Number Portability and Advanced Call-Screening in a SIP-Based IP-Telephony System," Jul. 1999, Bates Nos. DEF-CP-INV-00004044—DEF-CP-INV-00004062.

Rheinart, C., "WEB-Based Enhanced Services," Intelligent Networks and Intelligence in Networks, D. Gaiti (Ed.), Chapman & Hall, 1997, Bates Nos. DEF-CP-INV-00004063—DEF-CP-INV-00004074.

"Integrated Services Digital Network (ISDN); Call Waiting (CW) Supplementary Service, Supplementary Service," ETS 300 056, Oct. 1991, Bates Nos. DEF-CP-INV-00004075—DEF-CP-INV-00004090.

"Integrated Services Digital Network (ISDN); Call Waiting (CW) Supplementary Service, Functional Capabilities and Information Flows," ETS 300 057, May 1992, Bates Nos. DEF-CP-INV-00004091—DEF-CP-INV-00004113.

"Integrated Services Digital Network (ISDN); Call Waiting (CW) Supplementary Service, Digital Subscriber Signalling System No. one (DSS1) Protocol; Part 1: Protocol specification," ETS 300 058-1, Oct. 1991, Bates Nos. DEF-CP-INV-00004114—DEF-CP-INV-00004132.

"Integrated Services Digital Network (ISDN); Call Waiting (CW) Supplementary Service, Digital Subscriber Signalling System No. one (DSS1) Protocol; Part 2: Protocol Implementation Conformance Statement (PICS) proforma specification," ETS 300 058-2, Sep. 1995, Bates Nos. DEF-CP-INV-00004133—DEF-CP-INV-00004152.

(56) References Cited

OTHER PUBLICATIONS

"Integrated Services Digital Network (ISDN); Call Waiting (CW) Supplementary Service, Digital Subscriber Signalling System No. one (DSS1) Protocol; Part 3: Test suite structure and Test Purposes (TSS&TP) specification for the user," ETS 300 058-3, Sep. 1996, Bates Nos. DEF-CP-INV-00004153—DEF-CP-INV-00004166.
"Integrated Services Digital Network (ISDN); Call Waiting (CW) Supplementary Service, Digital Subscriber Signalling System No. one (DSS1) Protocol; Part 4: Abstract Test Suite (ATS) and Partial Protocol Implementation eXtra Information for Testing (PIXIT) Proforma Specification for the User," ETS 300 058-4, May 1997, Bates Nos. DEF-CP-INV-00004167—DEF-CP-INV-00004189.
"Integrated Services Digital Network (ISDN); Call Waiting (CW) Supplementary Service, Digital Subscriber Signalling System No. one (DSS1) Protocol; Part 5: Test Suite Structure and Test Purposes (TSS&TP) specification for the network," ETS 300 058-5, May 1997, Bates Nos. DEF-CP-INV-00004190—DEF-CP-INV-00004204.
"Integrated Services Digital Network (ISDN); Call Waiting (CW) Supplementary Service, Digital Subscriber Signalling System No. one (DSS1) Protocol; Part 6: Abstract Test Suite (ASTS) and partial Protocol Implementation eXtra Information to Testing (PIXIT) proforma specification for the network," ETS 300 058-6, May 1997, Bates Nos. DEF-CP-INV-00004205-DEF-CP-INV-00004234.
"Integrated Services Digital Network (ISDN); Calling Line Identification Presentation (CLIP) supplementary service; Digital Subscriber Signalling System No. one (DSS1) protocol; Part 1: Protocol specification," ETS 300 092-1, Mar. 1992, Bates Nos. DEF-CP-INV-00004235—DEF-CP-INV-00004258.
"Integrated Services Digital Network (ISDN); User-network Interface layer 3, Specifications for basic call control," ETS 300 102-1, Dec. 1990, Bates Nos. DEF-CP-INV-00004259—DEF-CP-INV-00004471.
"Integrated Services Digital Network (ISDN); User-network Interface layer 3, Specifications for basic call control, Specification Description Language (SDL) diagrams" ETS 300 102-2, Dec. 1990, Bates Nos. DEF-CP-INV-00004472—DEF-CP-INV-00004545.
"Integrated Services Digital Network (ISDN); Explicit Call Transfer (ECT) supplementary service, Digital Subscriber Signalling System No. one (DSS1) protocol Part 1: Protocol specification" ETS 300 369-1, May 1995, DEF-CP-INV-00004546—DEF-CP-INV-00004588.
Kahane et al. "Call Management Agent system requirements function architecture and protocol," dated Jan. 15, 1997, DEF-CP-INV-00004667—DEF-CP-INV-00004710.
Kahane et al., "Call Management Agent System Specification," VoIP Forum Technical Committee Contribution, Aug. 15, 1996, Bates Nos. DEF-CP-INV-00004617—DEF-CP-INV-00004652.
Biggs et al., "The SIP Replaces Header," Jul. 12, 2001, Bates Nos. DEF-CP-INV-00004589—DEF-CP-INV-00004594.
Rosenberg et al., "Third Party Call Control in SIP," Nov. 21, 2001, Bates Nos. DEF-CP-INV-00004595—DEF-CP-INV-00004616.
Exhibit A-1, Initial Invalidity Claim Chart for United States Patent No. 7,822,188 Based on U.S. Patent No. 6,430,282 ("Bannister") dated Jun. 23, 2014.
Exhibit A-2, Initial Invalidity Claim Chart for United States Patent No. 7,822,188 Based on U.S. Patent No. 7,224,774 ("Brown") dated Jun. 23, 2014.
Exhibit A-3, Initial Invalidity Claim Chart for United States Patent No. 7,822,188 Based on "A Proposal for Internet Call Waiting Service using Sip" ("Brusilovsky") dated Jun. 23, 2014.
Exhibit A-4, Initial Invalidity Claim Chart for United States Patent No. 7,822,188 Based on U.S. Patent No. 5,432,845 ("Burd") dated Jun. 23, 2014.
Exhibit A-5, Initial Invalidity Claim Chart for United States Patent No. 7,822,188 Based on U.S. Patent App. 2002/0067816 ("Bushnell") dated Jun. 23, 2014.
Exhibit A-6, Initial Invalidity Claim Chart for United States Patent No. 7,822,188 Based on U.S. Patent No. 7,190,773 ("D'Silva") dated Jun. 23, 2014.
Exhibit A-7, Initial Invalidity Claim Chart for United States Patent No. 7,822,188 Based on U.S. Patent No. 6,366,661 ("Devillier") dated Jun. 23, 2014.
Exhibit A-8, Initial Invalidity Claim Chart for United States Patent No. 7,822,188 Based on U.S. Patent No. 5,991,394 ("Dezonno") dated Jun. 23, 2014.
Exhibit A-9, Initial Invalidity Claim Chart for United States Patent No. 7,822,188 Based on U.S. Patent No. 6,144,667 ("Doshi") dated Jun. 23, 2014.
Exhibit A-10, Initial Invalidity Claim Chart for United States Patent No. 7,822,188 Based on U.S. Patent No. 7,242,680 ("Gallant") dated Jun. 23, 2014.
Exhibit A-11, Initial Invalidity Claim Chart for United States Patent No. 7,822,188 Based on U.S. Patent Application Publication No. 2002/0176404 ("Girard") dated Jun. 23, 2014.
Exhibit A-12, Initial Invalidity Claim Chart for United States Patent No. 7,822,188 Based on U.S. Patent No. 6,389,117 ("Gross") dated Jun. 23, 2014.
Exhibit A-13, Initial Invalidity Claim Chart for United States Patent No. 7,822,188 Based on U.S. Patent No. 7,020,255 ("Gruchala") dated Jun. 23, 2014.
Exhibit A-14, Initial Invalidity Claim Chart for United States Patent No. 7,822,188 Based on U.S. Patent No. 6,693,897 ("Huang") dated Jun. 23, 2014.
Exhibit A-15 Initial Invalidity Claim Chart for United States Patent No. 7,822,188 Based on U.S. Patent No. 5,475,748 ("Jones") dated Jun. 23, 2014.
Exhibit A-16, Initial Invalidity Claim Chart for United States Patent No. 7,822,188 Based on U.S. Patent No. 6,690,672 ("Klein") dated Jun. 23, 2014.
Exhibit A-17, Initial Invalidity Claim Chart for United States Patent No. 7,822,188 Based on U.S. Patent No. 5,802,160 ("Kugell") dated Jun. 23, 2014.
Exhibit A-18, Initial Invalidity Claim Chart for United States Patent No. 7,822,188 Based on U.S. Patent No. 6,430,289 ("Liffick") dated Jun. 23, 2014.
Exhibit A-19, Initial Invalidity Claim Chart for United States Patent No. 7,822,188 Based on U.S. Patent No. 5,903,636 ("Malik") dated Jun. 23, 2014.
Exhibit A-20, Initial Invalidity Claim Chart for United States Patent No. 7,822,188 Based on U.S. Patent No. 7,245,612 ("Petty '612") dated Jun. 23, 2014.
Exhibit A-21, Initial Invalidity Claim Chart for United States Patent No. 7,822,188 Based on U.S. Patent No. 6,337,858 ("Petty '858") dated Jun. 23, 2014.
Exhibit A-22, Initial Invalidity Claim Chart for United States Patent No. 7,822,188 Based on U.S. Patent No. 6,137,870 ("Scherer") dated Jun. 23, 2014.
Exhibit A-23, Initial Invalidity Claim Chart for United States Patent No. 7,822,188 Based on U.S. Patent No. 6,130,935 ("Shaffer") dated Jun. 23, 2014.
Exhibit A-24, Initial Invalidity Claim Chart for United States Patent No. 7,822,188 Based on U.S. Patent No. 7,213,073 ("Slavin") dated Jun. 23, 2014.
Exhibit A-25, Initial Invalidity Claim Chart for United States Patent No. 7,822,188 Based on U.S. Patent No. 5,487,111 ("Slusky") dated Jun. 23, 2014.
Exhibit A-26, Initial Invalidity Claim Chart for United States Patent No. 7,822,188 Based on U.S. Patent No. 5,784,444 ("Snyder") dated Jun. 23, 2014.
Exhibit A-27, Initial Invalidity Claim Chart for United States Patent No. 7,822,188 Based on U.S. Patent No. 5,864,612 ("Strauss") dated Jun. 23, 2014.
Exhibit A-28, Initial Invalidity Claim Chart for United States Patent No. 7,822,188 Based on U.S. Patent No. 5,901,209 ("Tannenbaum") dated Jun. 23, 2014.
Exhibit A-29, Initial Invalidity Claim Chart for United States Patent No. 7,822,188 Based on U.S. Patent No. 6,574,328 ("Wood '328") dated Jun. 23, 2014.
Exhibit A-30, Initial Invalidity Claim Chart for United States Patent No. 7,822,188 Based on U.S. Pat. No. 6,091,808 ("Wood '808") dated Jun. 23, 2014.

(56) References Cited

OTHER PUBLICATIONS

Exhibit A-31, Initial Invalidity Claim Chart for United States Patent No. 7,822,188 Based on U.S. Pat. No. 7,194,080 ("Worsham") dated Jun. 23, 2014.
Exhibit B-1, Initial Invalidity Claim Chart for United States Patent No. 8,064,588 Based on U.S. Patent No. 6,816,481 (Adams) dated Jun. 23, 2014.
Exhibit B-2, Initial Invalidity Claim Chart for United States Patent No. 8,064,588 Based on U.S. Patent No. 7,224,774 ("Brown") dated Jun. 23, 2014.
Exhibit B-3, Initial Invalidity Claim Chart for United States Patent No. 8,064,588 Based on "A Proposal for Internet Call Waiting Service using SIP" ("Brusilovsky") dated Jun. 23, 2014.
Exhibit B-4, Initial Invalidity Claim Chart for United States Patent No. 8,064,588 Based on U.S. Patent No. 5,432,845 ("Burd") dated Jun. 23, 2014.
Exhibit B-5, Initial Invalidity Claim Chart for United States Patent No. 8,064,588 Based on U.S. Patent No. 6,404,860 ("Casellini") dated Jun. 23, 2014.
Exhibit B-6, Initial Invalidity Claim Chart for United States Patent No. 8,064,588 Based on U.S. Patent No. 7,190,773 ("D'Silva") dated Jun. 23, 2014.
Exhibit B-7, Initial Invalidity Claim Chart for United States Patent No. 8,064,588 Based on U.S. Patent No. 5,946,381 ("Danne") dated Jun. 23, 2014.
Exhibit B-8, Initial Invalidity Claim Chart for United States Patent No. 8,064,588 Based on U.S. Patent No. 6,366,661 ("Devillier") dated Jun. 23, 2014.
Exhibit B-9, Initial Invalidity Claim Chart for United States Patent No. 8,064,588 Based on U.S. Patent No. 4,723,273 ("Diesel") dated Jun. 23, 2014.
Exhibit B-10, Initial Invalidity Claim Chart for United States Patent No. 8,064,588 Based on U.S. Patent No. 6,477,246 ("Dolan") dated Jun. 23, 2014.
Exhibit B-11, Initial Invalidity Claim Chart for United States Patent No. 8,064,588 Based on U.S. Patent No. 6,031,896 ("Gardell") dated Jun. 23, 2014.
Exhibit B-13, Initial Invalidity Claim Chart for United States Patent No. 8,064,588 Based on U.S. Patent No. 5,471,519 ("Howe") dated Jun. 23, 2014.
Exhibit B-14, Initial Invalidity Claim Chart for United States Patent No. 8,064,588 Based on U.S. Patent No. 6,693,897 ("Huang") dated Jun. 23, 2014.
Exhibit B-15, Initial Invalidity Claim Chart for United States Patent No. 8,064,588 Based on U.S. Patent No. 5,475,748 ("Jones") dated Jun. 23, 2014.
Exhibit B-16, Initial Invalidity Claim Chart for United States Patent No. 8,064,588 Based on U.S. Patent No. 5,802,160 ("Kugell") dated Jun. 23, 2014.
Exhibit B-17, Initial Invalidity Claim Chart for United States Patent No. 8,064,588 Based on U.S. Patent No. 7,245,612 ("Petty '612") dated Jun. 23, 2014.
Exhibit B-18, Initial Invalidity Claim Chart for United States Patent No. 8,064,588 Based on Daniele Rizzetto & Claudio Catania, A Voice Over IP Service Architecture for Integrated Communications, IEEE Internet Computing, May/Jun. 1999, at 53-62 ("Rizzetto & Catania") dated Jun. 23, 2014.
Exhibit B-19, Initial Invalidity Claim Chart for United States Patent No. 8,064,588 Based on U.S. Patent No. 6,574,328 ("Wood '328") dated Jun. 23, 2014.
Exhibit C-1, Initial Invalidity Claim Chart for United States Patent No. 8,351,591 Based on U.S. Patent App. 2002/0067816 ("Bushnell") dated Jun. 23, 2014.
Exhibit C-2, Initial Invalidity Claim Chart for United States Patent No. 8,351,591 Based on U.S. Patent Application Publication No. 2002/0176404 ("Girard") dated Jun. 23, 2014.
Exhibit C-3, Initial Invalidity Claim Chart for United States Patent No. 8,351,591 Based on U.S. Patent No. 7,020,255 ("Gruchala") dated Jun. 23, 2014.
Exhibit C-4, Initial Invalidity Claim Chart for United States Patent No. 8,351,591 Based on U.S. Patent No. 6,693,897 ("Huang") dated Jun. 23, 2014.
Exhibit C-5, Initial Invalidity Claim Chart for United States Patent No. 8,351,591 Based on U.S. Patent No. 5,475,748 ("Jones") dated Jun. 23, 2014.
Exhibit C-6, Initial Invalidity Claim Chart for United States Patent No. 8,351,591 Based on U.S. Patent No. 5,802,160 ("Kugell") dated Jun. 23, 2014.
Exhibit C-7, Initial Invalidity Claim Chart for United States Patent No. 8,351,591 Based on U.S. Patent No. 5,903,636 ("Malik") dated Jun. 23, 2014.
Exhibit C-8, Initial Invalidity Claim Chart for United States Patent No. 8,351,591 Based on U.S. Patent No. 7,245,612 ("Petty '612") dated Jun. 23, 2014.
Exhibit C-9, Initial Invalidity Claim Chart for United States Patent No. 8,351,591 Based on U.S. Patent No. 6,137,870 ("Scherer") dated Jun. 23, 2014.
Exhibit C-10, Initial Invalidity Claim Chart for United States Patent No. 8,351,591 Based on U.S. Patent No. 6,130,935 ("Shaffer") dated Jun. 23, 2014.
Exhibit C-11, Initial Invalidity Claim Chart for United States Patent No. 8,351,591 Based on U.S. Patent No. 5,784,444 ("Snyder") dated Jun. 23, 2014.
Exhibit C-12, Initial Invalidity Claim Chart for United States Patent No. 8,351,591 Based on U.S. Patent No. 5,864,612 ("Strauss") dated Jun. 23, 2014.
Exhibit C-13, Initial Invalidity Claim Chart for United States Patent No. 8,351,591 Based on U.S. Patent No. 5,901,209 ("Tannenbaum") dated Jun. 23, 2014.
Exhibit C-14, Initial Invalidity Claim Chart for United States Patent No. 8,351,591 Based on U.S. Pat. No. 6,091,808 ("Wood '808") dated Jun. 23, 2014.
Exhibit D-1, Initial Invalidity Claim Chart for United States Patent No. 7,636,428 Based on U.S. Patent No. 6,816,481 (Adams) dated Jun. 23, 2014.
Exhibit D-2, Initial Invalidity Claim Chart for United States Patent No. 7,636,428 Based on U.S. Patent No. 6,122,347 ("Borland") dated Jun. 23, 2014.
Exhibit D-3, Initial Invalidity Claim Chart for United States Patent No. 7,636,428 Based on U.S. Patent No. 7,224,774 ("Brown") dated Jun. 23, 2014.
Exhibit D-4, Initial Invalidity Claim Chart for United States Patent No. 7,636,428 Based on "A Proposal for Internet Call Waiting Service using SIP" ("Brusilovsky") dated Jun. 23, 2014.
Exhibit D-5, Initial Invalidity Claim Chart for United States Patent No. 7,636,428 Based on "The CallManager system: A platform for intelligent telecommunications services" ("CallManager") dated Jun. 23, 2014.
Exhibit D-6, Initial Invalidity Claim Chart for United States Patent No. 7,636,428 Based on U.S. Patent No. 6,404,860 ("Casellini") dated Jun. 23, 2014.
Exhibit D-7, Initial Invalidity Claim Chart for United States Patent No. 7,636,428 Based on U.S. Patent No. 7,190,773 ("D'Silva") dated Jun. 23, 2014.
Exhibit D-8, Initial Invalidity Claim Chart for United States Patent No. 7,636,428 Based on U.S. Patent No. 5,946,381 ("Danne") dated Jun. 23, 2014.
Exhibit D-9, Initial Invalidity Claim Chart for United States Patent No. 7,636,428 Based on U.S. Patent No. 6,366,661 ("Devillier") dated Jun. 23, 2014.
Exhibit D-10 Initial Invalidity Claim Chart for United States Patent No. 7,636,428 Based on U.S. Patent No. 6,477,246 ("Dolan") dated Jun. 23, 2014.
Exhibit D-11, Initial Invalidity Claim Chart for United States Patent No. 7,636,428 Based on U.S. Patent No. 6,031,896 ("Gardell") dated Jun. 23, 2014.
Exhibit D-12, Initial Invalidity Claim Chart for United States Patent No. 7,636,428 Based on U.S. Patent Application Publication No. 2002/0176404 ("Girard") dated Jun. 23, 2014.
Exhibit D-13, Initial Invalidity Claim Chart for United States Patent No. 7,636,428 Based on U.S. Patent No. 5,471,519 ("Howe") dated Jun. 23, 2014.

(56) References Cited

OTHER PUBLICATIONS

Exhibit D-14, Initial Invalidity Claim Chart for United States Patent No. 7,636,428 Based on U.S. Patent No. 6,693,897 ("Huang") dated Jun. 23, 2014.
Exhibit D-15, Initial Invalidity Claim Chart for United States Patent No. 7,636,428 Based on U.S. Patent No. 5,862,208 ("MeLampy") dated Jun. 23, 2014.
Exhibit D-16, Initial Invalidity Claim Chart for United States Patent No. 7,636,428 Based on U.S. Patent No. 7,245,612 ("Petty '612") dated Jun. 23, 2014.
Exhibit D-17, Initial Invalidity Claim Chart for United States Patent No. 7,636,428 Based on Daniele Rizzetto & Claudio Catania, A Voice Over IP Service Architecture for Integrated Communications, IEEE Internet Computing, May/Jun. 1999, at 53-62 ("Rizzetto & Catania") dated Jun. 23, 2014.
Exhibit D-18, Initial Invalidity Claim Chart for United States Patent No. 7,636,428 Based on U.S. Patent No. 6,574,328 ("Wood '328") dated Jun. 23, 2014.
Exhibit E-1, Initial Invalidity Claim Chart for United States Patent No. 7,555,110 Based on U.S. Patent No. 7,224,774 ("Brown") dated Jun. 23, 2014.
Exhibit E-2, Initial Invalidity Claim Chart for United States Patent No. 7,555,110 Based on U.S. Patent No. 6,031,896 ("Gardell") dated Jun. 23, 2014.
Exhibit E-3, Initial Invalidity Claim Chart for United States Patent No. 7,555,110 Based on U.S. Patent No. 5,475,748 ("Jones") dated Jun. 23, 2014.
Exhibit E-4, Initial Invalidity Claim Chart for United States Patent No. 7,555,110 Based on U.S. Patent No. 5,862,208 ("MeLampy") dated Jun. 23, 2014.
Exhibit E-5, Initial Invalidity Claim Chart for United States Patent No. 7,555,110 Based on U.S. Patent No. 7,245,612 ("Petty '612") dated Jun. 23, 2014.
Exhibit F-1, Initial Invalidity. Claim Chart for United States Patent No. 8,325,901 Based on U.S. Patent No. 7,224,774 ("Brown") dated Jun. 23, 2014.
Exhibit F-2, Initial Invalidity Claim Chart for United States Patent No. 8,325,901 Based on U.S. Patent No. 6,031,896 ("Gardell") dated Jun. 23, 2014.
Exhibit F-3, Initial Invalidity Claim Chart for United States Patent No. 8,325,901 Based on U.S. Patent No. 5,862,208 ("MeLampy") dated Jun. 23, 2014.
Exhibit F-4, Initial Invalidity Claim Chart for United States Patent No. 8,325,901 Based on U.S. Patent No. 7,245,612 ("Petty '612") dated Jun. 23, 2014.
Exhibit G-1, Initial Invalidity Claim Chart for United States Patent No. 7,397,910 Based on U.S. Patent No. 6,122,347 ("Borland") dated Jun. 23, 2014.
Exhibit G-2, Initial Invalidity Claim Chart for United States Patent No. 7,397,910 Based on U.S. Patent No. 7,224,774 ("Brown") dated Jun. 23, 2014.
Exhibit G-3, Initial Invalidity Claim Chart for United States Patent No. 7,397,910 Based on U.S. Patent No. 6,031,896 ("Gardell") dated Jun. 23, 2014.
Exhibit G-4, Initial Invalidity Claim Chart for United States Patent No. 7,397,910 Based on U.S. Patent No. 5,862,208 ("MeLampy") dated Jun. 23, 2014.
Exhibit G-5, Initial Invalidity Claim Chart for United States Patent No. 7,397,910 Based on U.S. Patent No. 7,245,612 ("Petty '612") dated Jun. 23, 2014.
Jain, Raj "Voice over IP: Issues and Challenges," The Ohio State University, Aug. 14, 1998, Bates Nos. DEF-CP-INV-00002681—DEF-CP-INV-00002722.
Exhibit B-12, Initial Invalidity Claim Chart for United States Patent No. 8,064,588 Based on U.S. Patent Application Publication No. 2002/0176404 ("Girard") dated Jun. 23, 2014.
Joint Claim Construction Brief (Call Processing) filed Dec. 10, 2014, in the matters of: (1) *Callwave Communications, LLC v. AT&T Inc., AT&T Mobility, LLC and Google Inc.*, proceeding No. C.A. No. 12-1701-RGA; (2) *Callwave Communications, LLC v. Sprint Spectrum L.P., Sprint Communications Company L.P. and Google Inc.*, proceeding No. C.A. No. 12-1702-RGA; (3) *Callwave Communications, LLC v. Verizon Services Corp., Cellco Partnership D/B/A Verizon Wireless and Google Inc.*, proceeding No. C.A. No. 12-1704-RGA; and (4) *Broadsoft, Inc. v. Callwave Communications, LLC*, proceeding No. C.A. No. 13-711-RGA; each filed in The United States District Court For The District Of Delaware (the "Delaware Cases") (91 pp).
Callwave's claim construction letter re outcall from Pepper Hamilton LLP to The Honorable Richard G. Andrews of the United States District Court, dated Jan. 9, 2015, regarding the Delaware Cases (referenced above) (1 page).
Callwave's claim construction letter re switched network from Pepper Hamilton LLP to The Honorable Richard G. Andrews of the United States District Court, dated Jan. 12, 2015, regarding the Delaware Cases (referenced above) (3 pp).
Defendants' claim construction letter re switched network from Morris, Nichols, Arsht & Tunnell LLP to The Honorable Richard G. Andrews of the United States District Court, dated Jan. 12, 2015, regarding the Delaware Cases (referenced above) (3 pp).
Defendants' response to Callwave's claim construction letter re outcall from Morris, Nichols, Arsht & Tunnell LLP to The Honorable Richard G. Andrews of the United States District Court, dated Jan. 12, 2015, regarding the Delaware Cases (referenced above) (3 pp).
Harry Newton, *Newton's Telecom Dictionary*, Telecom Books/CMP Media Inc., 16th Ed., Expanded and Updated Feb. 2000, filed as Exhibit A on Jan. 12, 2015 in the Delaware Cases (referenced above) (6 pp).
Annabel Z. Dodd, *The Essential Guide to Telecommunications*, 2nd Ed., 2000, Prentice Hall PTR, Upper Saddle River, NJ, filed as Exhibit 1 on Dec. 10, 2014 in the Delaware Cases (referenced above) (5 pp).
File History of U.S. Appl. No. 60/719,635 for Methods and Systems for Call Forwarding, Call Screening, and Call Conferencing, compiled Mar. 15, 2013, and filed as Exhibit 2 on Dec. 10, 2014 in the Delaware Cases (referenced above) (45 pp).
Phil Hochmuth, *U.S. Robotics offers 56K VoIP modem*, Network World, Jan. 2, 2001, filed as Exhibit 3 on Dec. 10, 2014 in the Delaware Cases (referenced above) (3 pp.)
Provisional Patent Application, U.S. Appl. No. 60/127,434 for A Method for Providing Expanded Telecommunications Service, filed Apr. 1, 1999 in the U.S. Patent and Trademark Office, and filed as Exhibit 4 on Dec. 10, 2014 in the Delaware Cases (referenced above) (33 pp).
Patent Application, U.S. Appl. No. 10/439,601 for Systems and Methods for Call Screening, filed May 16, 2003 in the U.S. Patent and Trademark Office, and filed as Exhibit 5 on Dec. 10, 2014 in the Delaware Cases (referenced above) (44 pp).
Declaration of David Lucantoni, Ph.D. in Support of CallWave Communications, LLC's Opening Claim Construction Brief, filed as Exhibit 6 on Dec. 10, 2014 in the Delaware Cases (referenced above) (40 pp).
Supplemental Declaration of David Lucantoni, Ph.D. in Support of CallWave Communications, LLC's Claim Construction Brief, filed as Exhibit 7 on Dec. 10, 2014 in the Delaware Cases (referenced above) (17 pp).
Memorandum Opinion in Civil Action Nos. 12-1701-RGA, 12-1702-RGA, 12-1703-RGA, 12-1704-RGA, 12-1788-RGA, U.S. District Court for the District of Delaware, filed Dec. 17, 2014, 22 pages.
Defendants' Supplemental Invalidity Contentions, filed Jan. 13, 2015, in the matters (1) *Callwave Communications, LLC v. AT&T Mobility, LLC, and Google Inc.*, Case No. C.A. 12-1701-RGA; (2) *Callwave Communications, LLC v. Sprint Spectrum L.P., Sprint Communications Company L.P., and Google Inc.*, Case No. C.A. No. 12-1702-RGA; (3) *Callwave Communications, LLC v. Verizon Services Corp., Cellco Partnership, D.B.A. Verizon Wireless, and Google Inc.*, Case No. C.A. No. 12-1704-RGA; and (4) *Broadsoft, Inc. v. Callwave Communications, LLC*, Case No. C.A. No. 13-711-RGA (hereinafter collectively called the "Callwave/AT&T/Sprint/Verizon/Broadsoft cases"); all in the United States District Court for the District of Delaware; Bates Nos. CWF00041040-CWF0041047; 8 pp.

(56) References Cited

OTHER PUBLICATIONS

Exhibit DBS1, Supplemental Invalidity Claim Chart for U.S. Pat. No. 7,636,428 Based on Panasonic Digital Business System, filed Jan. 13, 2015, in the Callwave/AT&T/Sprint/Verizon/Broadsoft cases cited above; Bates Nos. CWF00041048-CWF0041068; 21 pp.
Exhibit DBS2, Supplemental Invalidity Claim Chart for U.S. Pat. No. 8,064,588 Based on Panasonic Digital Business System, filed Jan. 13, 2015, in the Callwave/AT&T/Sprint/Verizon/Broadsoft cases cited above; Bates Nos. CWF00041069-CWF0041097; 29 pp.
Exhibit Norris1, Supplemental Invalidity Claim Chart for U.S. Pat. No. 7,636,428 Based on U.S. Pat. No. 5,805,587 ("Norris"), filed Jan. 13, 2015, in the Callwave/AT&T/SprintNerizon/Broadsoft cases cited above; Bates Nos. CWF00041098-CWF0041141; 44 pp.
Exhibit Norris2, Supplemental Invalidity Claim Chart for U.S. Pat. No. 8,064,588 Based on U.S. Pat. No. 5,805,587 ("Norris"), filed Jan. 13, 2015, in the Callwave/AT&T/SprintNerizon/Broadsoft cases cited above; Bates Nos. CWF00041142-CWF0041176; 35 pp.
Fonality's Preliminary Invalidity Contentions, filed Jan. 6, 2015, in the matter of *Callwave Communications, LLC* v. *Fonality Inc.*, Case No. C.A. 14-398-RGA (hereinafter called the "Fonality case"); in the United States District Court for the District of Delaware; 30 pp.
Exhibit A1, Initial Invalidity Claim Chart for U.S. Pat. No. 7,822,188 Based on U.S. Pat. No. 6,430,282 ("Bannister"); Exhibit A2, Initial Invalidity Claim Chart for U.S. Pat. No. 7,822,188 Based on U.S. Pat. No. 7,224,774 ("Brown"); Exhibit A3, Initial Invalidity Claim Chart for U.S. Pat. No. 7,822,188 Based on "A Proposal for Internet Call Waiting Service using SIP" ("Brusilovsky"); Exhibit A4, Initial Invalidity Claim Chart for U.S. Pat. No. 7,822,188 Based on U.S. Pat. No. 5,432,845 ("Burd"); Exhibit A5, Initial Invalidity Claim Chart for U.S. Pat. No. 7,822,188 Based on U.S. Patent App. 2002/0067816 ("Bushnell"); Exhibit A6, Initial Invalidity Claim Chart for U.S. Pat. No. 7,822,188 Based on U.S. Pat. No. 7,190,773 ("D'Silva"); Exhibit A7, Initial Invalidity Claim Chart for U.S. Pat. No. 7,822,188 Based on U.S. Pat. No. 6,366,661 ("Devillier"); Exhibit A8, Initial Invalidity Claim Chart for U.S. Pat. No. 7,822,188 Based on U.S. Pat. No. 5,991,394 ("Dezonno"); Exhibit A9, Initial Invalidity Claim Chart for U.S. Pat. No. 7,822,188 Based on U.S. Pat. No. 6,155,667 ("Doshi"); Exhibit A10, Initial Invalidity Claim Chart for U.S. Pat. No. 7,822,188 Based on U.S. Patent No. 7,242.680 ("Gallant").
Exhibit A11, Initial Invalidity Claim Chart for U.S. Pat. No. 7,822,188 Based on U.S. Patent Application Publication No. 2002/0176404 ("Girard"); Exhibit A12, Initial Invalidity Claim Chart for U.S. Pat. No. 7,822,188 Based on U.S. Pat. No. 6,389,117 ("Gross"); Exhibit A13, Initial Invalidity Claim Chart for U.S. Pat. No. 7,822,188 Based on U.S. Pat. No. 7,020,255 ("Gruchala"); Exhibit A14, Initial Invalidity Claim Chart for U.S. Pat. No. 7,822,188 Based on U.S. Pat. No. 6,693,897 ("Huang"); Exhibit A15, Initial Invalidity Claim Chart for U.S. Pat. No. 7,822,188 Based on U.S. Pat. No. 5,475,748 ("Jones"); Exhibit A16, Initial Invalidity Claim Chart for U.S. Pat. No. 7,822,188 Based on U.S. Pat. No. 6,690,672 ("Klein"); Exhibit A17, Initial Invalidity Claim Chart for U.S. Pat. No. 7,822,188 Based on U.S. Pat. No. 5,802,160 ("Kugell"); Exhibit A18, Initial Invalidity Claim Chart for U.S. Pat. No. 7,822,188 Based on U.S. Pat. No. 6,430,289 ("Liffick"); Exhibit A19, Initial Invalidity Claim Chart for U.S. Pat. No. 7,822,188 Based on U.S. Pat. No. 5,903,636 ("Malik"); Exhibit A20, Initial Invalidity Claim Chart for U.S. Pat. No. 7,822,188 Based on U.S. Pat. No. 7,245,612 ("Petty '612"); Exhibit A21, Initial Invalidity Claim Chart for U.S. Pat. No. 7,822,188 Based on U.S. Pat. No. 6,337,858 ("Petty '858"); Exhibit A22, Initial Invalidity Claim Chart for U.S. Pat. No. 7,822,188 Based on U.S. Pat. No. 6,137,870 ("Scherer"); Exhibit A23, Initial Invalidity Claim Chart for U.S. Pat. No. 7,822,188 Based on U.S. Pat. No. 6,130,935 ("Shaffer"); Exhibit A24, Initial Invalidity Claim Chart for U.S. Pat. No. 7,822,188 Based on U.S. Pat. No. 7,213,073 ("Slavin"); Exhibit A25, Initial Invalidity Claim Chart for U.S. Pat. No. 7,822,188 Based on U.S. Pat. No. 5,487,111 ("Slusky"); Exhibit A26, Initial Invalidity Claim Chart for U.S. Pat. No. 7,822,188 Based on U.S. Pat. No. 5,784,444 ("Snyder"); Exhibit A27, Initial Invalidity Claim Chart for U.S. Pat. No. 7,822,188 Based on U.S. Pat. No. 5,864,612 ("Strauss"); Exhibit A28, Initial Invalidity Claim Chart for U.S. Pat. No. 7,822,188 Based on U.S. Pat. No. 5,901,209 ("Tannenbaum"); Exhibit A29, Initial Invalidity Claim Chart for U.S. Pat. No. 7,822,188 Based on U.S. Pat. No. 6,091,808 ("Wood '808"); Exhibit A30, Initial Invalidity Claim Chart for U.S. Pat. No. 7,822,188 Based on U.S. Pat. No. 6,574,328 ("Wood '328"); Exhibit A31, Initial Invalidity Claim Chart for U.S. Pat. No. 7,822,188 Based on U.S. Patent No. 7,194,080 ("Worsham"); all filed Jan. 6, 2015 in the Fonality case; 1007 pp.
Exhibit B1, Initial Invalidity Claim Chart for U.S. Pat. No. 8,064,588 Based on U.S. Pat. No. 6,816,481 ("Adams"); Exhibit B2, Initial Invalidity Claim Chart for U.S. Pat. No. 8,064,588 Based on U.S. Pat. No. 7,224,774 ("Brown"); Exhibit B3, Initial Invalidity Claim Chart for U.S. Pat. No. 8,064,588 Based on a Proposal for Internet Call Waiting Service using SIP ("Brusilovsky"); Exhibit B4, Initial Invalidity Claim Chart for U.S. Pat. No. 8,064,588 Based on U.S. Pat. No. 5,432,845 ("Burd"); Exhibit B5, Initial Invalidity Claim Chart for U.S. Pat. No. 8,064,588 Based on U.S. Pat. No. 6,404,860 ("Casellini"); Exhibit B6, Initial Invalidity Claim Chart for U.S. Pat. No. 8,064,588 Based on U.S. Pat. No. 7,190,773 ("D'Silva"); Exhibit B7, Initial Invalidity Claim Chart for U.S. Pat. No. 8,064,588 Based on U.S. Pat. No. 5,946,381 ("Danne"); Exhibit B8, Initial Invalidity Claim Chart for U.S. Pat. No. 8,064,588 Based on U.S. Pat. No. 6,366,661 ("Devillier"); Exhibit B9, Initial Invalidity Claim Chart for U.S. Pat. No. 8,064,588 Based on U.S. Pat. No. 4,723,273 ("Diesel"); Exhibit B10, Initial Invalidity Claim Chart for U.S. Pat. No. 8,064,588 Based on U.S. Pat. No. 6,477,246 ("Dolan"); Exhibit B11, Initial Invalidity Claim Chart for U.S. Pat. No. 8,064,588 Based on U.S. Pat. No. 6,031,896 ("Gardell"); Exhibit B12, Initial Invalidity Claim Chart for U.S. Pat. No. 8,064,588 Based on U.S. Patent Application Publication No. 2002/0176404 ("Girard"); Exhibit B13, Initial Invalidity Claim Chart for U.S. Pat. No. 8,064,588 Based on U.S. Pat. No. 5,471,519 ("Howe"); Exhibit B14, Initial Invalidity Claim Chart for U.S. Pat. No. 8,064,588 Based on U.S. Pat. No. 6,693,897 ("Huang"); Exhibit B15, Initial Invalidity Claim Chart for U.S. Pat. No. 8,064,588 Based on U.S. Pat. No. 5,475,748 ("Jones"); Exhibit B16, Initial Invalidity Claim Chart for U.S. Pat. No. 8,064,588 Based on U.S. Pat. No. 5,802,160 ("Kugell"); Exhibit B17, Initial Invalidity Claim Chart for U.S. Pat. No. 8,064,588 Based on U.S. Pat. No. 7,245,612 ("Petty '612"); Exhibit B18, Initial Invalidity Claim Chart for U.S. Pat. No. 8,064,588 Based on Daniele Rizzetto & Claudio Catania, *A Voice Over IP Service Architecture for Integrated Communications,* IEEE Internet Computing, May/Jun. 1999, at 53-62 ("Rizzetto & Catania"); Exhibit B19, Initial Invalidity Claim Chart for U.S. Pat. No. 8,064,588 Based on U.S. Pat. No. 6,574,328 ("Wood '328"); all filed Jan. 6, 2015 in the Fonality case; 670 pp.
Exhibit C1, Initial Invalidity Claim Chart for U.S. Pat. No. 8,351,591 Based on U.S. Patent App. 2002/0067816 ("Bushnell"); Exhibit C2, Initial Invalidity Claim Chart for U.S. Pat. No. 8,351,591 Based on U.S. Patent Application Publication No. 2002/0176404 ("Girard"); Exhibit C3, Initial Invalidity Claim Chart for U.S. Pat. No. 8,351,591 [based on U.S. Pat. No. 7,020,255 ("Gruchala")]; Exhibit C4, Initial Invalidity Claim Chart for U.S. Pat. No. 8,351,591 Based on U.S. Pat. No. 6,693,897 ("Huang"); Exhibit C5, Initial Invalidity Claim Chart for U.S. Pat. No. 8,351,591 Based on U.S. Pat. No. 5,475,748 ("Jones"); Exhibit C6, Initial Invalidity Claim Chart for U.S. Pat. No. 8,351,591 Based on U.S. Pat. No. 5,802,160 ("Kugell"); Exhibit C7, Initial Invalidity Claim Chart for U.S. Pat. No. 8,351,591 Based on U.S. Pat. No. 5,903,636 ("Malik"); Exhibit C8, Initial Invalidity Claim Chart for U.S. Pat. No. 8,351,591 Based on U.S. Pat. No. 7,245,612 ("Petty '612"); Exhibit C9, Initial Invalidity Claim Chart for U.S. Pat. No. 8,351,591 Based on U.S. Pat. No. 6,137,870 ("Scherer"); Exhibit C10, Initial Invalidity Claim Chart for U.S. Pat. No. 8,351,591 Based on U.S. Pat. No. 6,130,935 ("Shaffer"); Exhibit C11, Initial Invalidity Claim Chart for U.S. Pat. No. 8,351,591 Based on U.S. Pat. No. 5,784,444 ("Snyder"); Exhibit C12, Initial Invalidity Claim Chart for U.S. Pat. No. 8,351,591 Based on U.S. Pat. No. 5,864,612 ("Strauss"); Exhibit C13, Initial Invalidity Claim Chart for U.S. Pat. No. 8,351,591 Based on U.S. Pat. No. 5,901,209 ("Tannenbaum"); Exhibit C14, Initial Invalidity Claim Chart for U.S. Pat. No. 8,351,591 Based on U.S. Pat. No. 6,091,808 ("Wood '808"); all filed Jan. 6, 2015 in the Fonality case; 501 pp.
Exhibit D1, Initial Invalidity Claim Chart for U.S. Pat. No. 7,636,428 Based on U.S. Pat. No. 6,816,481 ("Adams"); Exhibit D2, Initial

(56) References Cited

OTHER PUBLICATIONS

Invalidity Claim Chart for U.S. Pat. No. 7,636,428 Based on U.S. Pat. No. 7,224,774 ("Brown"); Exhibit D3, Initial Invalidity Claim Chart for U.S. Pat. No. 7,636,428 Based on "A Proposal for Internet Call Waiting Service using SIP" ("Brusilovsky"); Exhibit D4, Initial Invalidity Claim Chart for U.S. Pat. No. 7,636,428 Based on "The CallManager system: A platform for intelligent telecommunications services" ("CallManager"); Exhibit D5, Initial Invalidity Claim Chart for U.S. Pat. No. 7,636,428 Based on U.S. Pat. No. 6,404,860 ("Casellini").

Exhibit D6, Initial Invalidity Claim Chart for U.S. Pat. No. 7,636,428 Based on U.S. Pat. No. 7,190,773 ("D'Silva"); Exhibit D7, Initial Invalidity Claim Chart for U.S. Pat. No. 7,636,428 Based on U.S. Pat. No. 5,946,381 ("Danne"); Exhibit D8, Initial Invalidity Claim Chart for U.S. Pat. No. 7,636,428 Based on U.S. Pat. No. 6,366,661 ("Devillier"); Exhibit D9, Initial Invalidity Claim Chart for U.S. Pat. No. 7,636,428 Based on U.S. Pat. No. 6,477,246 ("Dolan"); Exhibit D10, Initial Invalidity Claim Chart for U.S. Pat. No. 7,636,428 Based on U.S. Pat. No. 6,031,896 ("Gardell"); Exhibit D11, Initial Invalidity Claim Chart for U.S. Pat. No. 7,636,428 Based on U.S. Patent Application Publication No. 2002/0176404 ("Girard"); Exhibit D12, Initial Invalidity Claim Chart for U.S. Pat. No. 7,636,428 Based on U.S. Pat. No. 5,471,519 ("Howe"); Exhibit D13, Initial Invalidity Claim Chart for U.S. Pat. No. 7,636,428 Based on U.S. Pat. No. 6,693,897 ("Huang"); Exhibit D14, Initial Invalidity Claim Chart for U.S. Pat. No. 7,636,428 Based on U.S. Pat. No. 5,862,208 ("MeLampy"); Exhibit D15, Initial Invalidity Claim Chart for U.S. Pat. No. 7,636,428 Based on U.S. Pat. No. 7,245,612 ("Petty"); Exhibit D16, Initial Invalidity Claim Chart for U.S. Pat. No. 7,636,428 Based on Daniele Rizzetto & Claudio Catania, *A Voice Over IP Service Architecture for Integrated Communications*, IEEE Internet Computing, May/Jun. 1999, at 53-62 ("Rizzetto & Catania"); Exhibit D17, Initial Invalidity Claim Chart for U.S. Pat. No. 7,636,428 Based on U.S. Pat. No. 6,574,328 ("Wood '328"); all filed Jan. 6, 2015 in the Fonality case; 1070 pp.

Exhibit E1, Initial Invalidity Claim Chart for U.S. Pat. No. 7,555,110 Based on U.S. Pat. No. 7,224,774 ("Brown"); Exhibit E2, Initial Invalidity Claim Chart for U.S. Pat. No. 7,555,110 Based on U.S. Pat. No. 6,031,896 ("Gardell"); Exhibit E3, Initial Invalidity Claim Chart for U.S. Pat. No. 7,555,110 Based on U.S. Pat. No. 5,475,748 ("Jones"); Exhibit E4, Initial Invalidity Claim Chart for U.S. Pat. No. 7,555,110 Based on U.S. Pat. No. 5,862,208 ("MeLampy"); Exhibit E5, Initial Invalidity Claim Chart for U.S. Pat. No. 7,555,110 Based on U.S. Pat. No. 7,245,612 ("Petty"); all filed Jan. 6, 2015 in the Fonality case; 90 pp.

Exhibit F1, Initial Invalidity Claim Chart for U.S. Pat. No. 8,325,901 Based on U.S. Pat. No. 7,224,774 ("Brown"); Exhibit F2, Initial Invalidity Claim Chart for U.S. Pat. No. 8,325,901 Based on U.S. Patent No. 8,325,901 Based on U.S. Patent No. 6,031,896 ("Gardell"); Exhibit F3, Initial Invalidity Claim Chart for U.S. Pat. No. 8,325,901 Based on U.S. Pat. No. 5,862,208 ("MeLampy"); Exhibit F4, Initial Invalidity Claim Chart for U.S. Pat. No. 8,325,901 Based on U.S. Pat. No. 7,245,612 ("Petty '612"); all filed Jan. 6, 2015 in the Fonality case; 71 pp.

Exhibit G1, Initial Invalidity Claim Chart for U.S. Pat. No. 7,397,910 Based on U.S. Pat. No. 6,122,347 ("Borland"); Exhibit G2, Initial Invalidity Claim Chart for U.S. Pat. No. 7,397,910 Based on U.S. Pat. No. 7,224,774 ("Brown"); Exhibit G3, Initial Invalidity Claim Chart for U.S. Pat. No. 7,397,910 Based on U.S. Pat. No. 6,031,896 ("Gardell"); Exhibit G4, Initial Invalidity Claim Chart for U.S. Pat. No. 7,397,910 Based on U.S. Pat. No. 5,862,208 ("MeLampy"); Exhibit G5, Initial Invalidity Claim Chart for U.S. Pat. No. 7,397,910 Based on U.S. Pat. No. 7,245,612 ("Petty"); all filed Jan. 6, 2015 in the Fonality case; 156 pp.

Pepper, David J. et al., "The CallManager system: A platform for intelligent telecommunications services", Speech Communication—Special issue on interactive voice technology for telecommunication applications (IVITA '96), vol. 23 Issue 1-2, Oct. 1997, pp. 129-139.

Rizzetto, Daniele & Catania, Claudio, A Voice Over IP Service Architecture for Integrated Communications, IEEE Internet Computing, May/Jun. 1999, at 53-62.

Defendant 8X8's Initial Invalidity Contentions filed Dec. 23, 2014 in the United States District Court for the District of Delaware, Case No. C.A. No. 14-397-RGA (the "8X8 case"); 16 pp.

Exhibit A to Defendant 8X8's Initial Invalidity Contentions filed Dec. 23, 2014 in the 8X8 case; 6 pp.

Exhibit B to Defendant 8X8's Initial Invalidity Contentions filed Dec. 23, 2014 in the 8X8 case; 6 pp.

Exhibit C to Defendant 8X8's Initial Invalidity Contentions filed Dec. 23, 2014 in the 8X8 case; 6 pp.

Exhibit D to Defendant 8X8's Initial Invalidity Contentions filed Dec. 23, 2014 in the 8X8 case; 6 pp.

Exhibit E to Defendant 8X8's Initial Invalidity Contentions filed Dec. 23, 2014 in the 8X8 case; 6 pp.

Defendant 8X8's First Supplementation to its Initial Invalidity Contentions filed Jan. 6, 2015 in the 8X8 case; 4 pp.

Exhibit G-3, Initial Invalidity Claim Chart for U.S. Pat. No. 7,397,910 Based on U.S. Pat. No. 6,031,896 ("Gardell") to Defendant 8X8's First Supplementation to its Initial Invalidity Contentions filed Jan. 6, 2015 in the 8X8 case; 28 pp.

Exhibit S-1, Supplemental Invalidity Claim Chart for U.S. Pat. No. 7,636,428 Based on "The CallManager system: A platform for intelligent telecommunications services" ("CallManager"), to Defendant 8X8's First Supplementation to its Initial Invalidity Contentions filed Jan. 6, 2015 in the 8X8 case; 28 pp.

Exhibit S-2, Supplemental Invalidity Claim Chart for U.S. Pat. No. 7,636,428 Based on "A Proposal for Internet Call Waiting Service using SIP" ("Brusilovsky"), to Defendant 8X8's First Supplementation to its Initial Invalidity Contentions filed Jan. 6, 2015 in the 8X8 case; 32 pp.

Exhibit S-3, Supplemental Invalidity Claim Chart for U.S. Pat. No. 7,636,428 Based on Daniele Rizzetto & Claudio Catania, *A Voice Over IP Service Architecture for Integrated Communications*, IEEE Internet Computing, May/Jun. 1999, at 53-62 ("Rizzetto & Catania"), to Defendant 8X8's First Supplementation to its Initial Invalidity Contentions filed Jan. 6, 2015 in the 8X8 case; 32 pp.

Exhibit S-4, Supplemental Invalidity Claim Chart for U.S. Pat. No. 8,351,591 Based on U.S. Pat. No. 7,283,625, to Defendant 8X8's First Supplementation to its Initial Invalidity Contentions filed Jan. 6, 2015 in the 8X8 case; 9 pp.

Exhibit S-5, Supplemental Invalidity Claim Chart for U.S. Pat. No. 7,822,188 Based on U.S. Pat. No. 7,283,625, to Defendant 8X8's First Supplementation to its Initial Invalidity Contentions filed Jan. 6, 2015 in the 8X8 case; 13 pp.

Exhibit S-6, Supplemental Invalidity Claim Chart for U.S. Pat. No. 8,351,591 Based on U.S. Pat. No. 5,901,209, to Defendant 8X8's First Supplementation to its Initial Invalidity Contentions filed Jan. 6, 2015 in the 8X8 case; 14 pp.

Exhibit S-7, Supplemental Invalidity Claim Chart for U.S. Pat. No. 7,822,188 Based on U.S. Pat. No. 5,901,209, to Defendant 8X8's First Supplementation to its Initial Invalidity Contentions filed Jan. 6, 2015 in the 8X8 case; 15 pp.

Exhibit S-8, Supplemental Invalidity Claim Chart for U.S. Pat. No. 7,636,428 Based on U.S. Pat. No. 6,853,714 ("714" and/or "Liljestrand"), to Defendant 8X8's First Supplementation to its Initial Invalidity Contentions filed Jan. 6, 2015 in the 8X8 case; 12 pp.

Exhibit S-9, Supplemental Invalidity Claim Chart for U.S. Pat. No. 8,064,588 Based on U.S. Pat. No. 6,853,714 ("714" and/or "Liljestrand"), to Defendant 8X8's First Supplementation to its Initial Invalidity Contentions filed Jan. 6, 2015 in the 8X8 case; 8 pp.

Exhibit S-10, Supplemental Invalidity Claim Chart for U.S. Pat. No. 7,397,910 Based on U.S. Pat. No. 6,853,714, to Defendant 8X8's First Supplementation to its Initial Invalidity Contentions filed Jan. 6, 2015 in the 8X8 case; 3 pp.

Exhibit S-12, Supplemental Invalidity Claim Chart for U.S. Pat. No. 7,636,428 Based on U.S. Pat. No. 7,408,919 ("919" and/or "McMullin"), to Defendant 8X8's First Supplementation to its Initial Invalidity Contentions filed Jan. 6, 2015 in the 8X8 case; 14 pp.

(56) References Cited

OTHER PUBLICATIONS

Exhibit S-13, Supplemental Invalidity Claim Chart for U.S. Pat. No. 8,064,588 Based on U.S. Pat. No. 7,408,919, to Defendant 8X8's First Supplementation to its Initial Invalidity Contentions filed Jan. 6, 2015 in the 8X8 case; 5 pp.
Exhibit S-14, Supplemental Invalidity Claim Chart for U.S. Pat. No. 7,397,910 Based on U.S. Pat. No. 7,408,919, to Defendant 8X8's First Supplementation to its Initial Invalidity Contentions filed Jan. 6, 2015 in the 8X8 case; 3 pp.
Defendant 8X8's Supplemental Invalidity Contentions Exemplified Using the Asserted Claims in the 910 Patent-In-Suit, filed Jan. 13, 2015 in the 8X8 case; 4 pp.
Exhibit S-15, Supplemental Invalidity Claim Chart for U.S. Pat. No. 7,397,910 Based on U.S. Pat. No. 6,373,517 ("Davis") (1997), to Defendant 8X8's Supplemental Invalidity Contentions Exemplified Using the Asserted Claims in the '910 Patent-In-Suit, filed Jan. 13, 2015 in the 8X8 case; 4 pp.
Exhibit S-16, Supplemental Invalidity Claim Chart for U.S. Pat. No. 7,397,910 Based on U.S. Pat. No. 6,124,882 ("Voois") (1998), to Defendant 8X8's Supplemental Invalidity Contentions Exemplified Using the Asserted Claims in the '910 Patent-In-Suit, filed Jan. 13, 2015 in the 8X8 case; 4 pp.
Exhibit S-17, Supplemental Invalidity Claim Chart for U.S. Pat. No. 7,397,910 Based on U.S. Pat. No. 6,226,031 ("Barraclough") (1998), to Defendant 8X8's Supplemental Invalidity Contentions Exemplified Using the Asserted Claims in the '910 Patent-In-Suit, filed Jan. 13, 2015 in the 8X8 case; 4 pp.
Defendant 8X8's Supplemental Invalidity Contentions Exemplified Using the Asserted Claims of the '428 and '588 (& '910) Patents, filed Jan. 15, 2015 in the 8X8 case; 5 pp.
Exhibit S-18, Supplemental Invalidity Claim Chart for U.S. Pat. No. 7,636,428 Based on U.S. Pat. No. 6,373,517 ("Davis") (filed Apr. 12, 2000), to Defendant 8X8's Supplemental Invalidity Contentions Exemplified Using the Asserted Claims of the '428 and '588 (& '910) Patents, filed Jan. 15, 2015 in the 8X8 case; 11 pp.
Exhibit S-19, Supplemental Invalidity Claim Chart for U.S. Pat. No. 7,636,428 Based on U.S. Pat. No. 6,124,882 ("Voois") (filed Jan. 9, 1998), to Defendant 8X8's Supplemental Invalidity Contentions Exemplified Using the Asserted Claims of the '428 and '588 (& '910) Patents, filed Jan. 15, 2015 in the 8X8 case; 9 pp.
Exhibit S-20, Supplemental Invalidity Claim Chart for U.S. Pat. No. 7,636,428 Based on U.S. Pat. No. 6,226,031 ("Barraclough") (filed Oct. 22, 1998), to Defendant 8X8's Supplemental Invalidity Contentions Exemplified Using the Asserted Claims of the '428 and '588 (& '910) Patents, filed Jan. 15, 2015 in the 8X8 case; 8 pp.
Exhibit S-21, Supplemental Invalidity Claim Chart for U.S. Pat. No. 7,636,428 Based on U.S. Pat. No. 7,218,721 "Vincent" (including its underlying U.S. Appl. No. 61/345,258, filed Jan. 2, 2002), to Defendant 8X8's Supplemental Invalidity Contentions Exemplified Using the Asserted Claims of the '428 and '588 (& '910) Patents, filed Jan. 15, 2015 in the 8X8 case; 7 pp.
Exhibit S-22, Supplemental Invalidity Claim Chart for U.S. Pat. No. 7,636,428 Based on U.S. Pat. No. 7,394,803 ("Petit-Huguenin") (filed Sep. 28, 2001), to Defendant 8X8's Supplemental Invalidity Contentions Exemplified Using the Asserted Claims of the '428 and '588 (& '910) Patents, filed Jan. 15, 2015 in the 8X8 case; 8 pp.
Exhibit S-23, Supplemental Invalidity Claim Chart for U.S. Pat. No. 7,636,428 Based on U.S. Pat. No. 7,202,884 ("Barraclough") (filed Jun. 20, 2001) (including its underlying U.S Appl. No. 60/213,048, filed Jun. 21, 2000), to Defendant 8X8's Supplemental Invalidity Contentions Exemplified Using the Asserted Claims of the '428 and '588 (& '910) Patents, filed Jan. 15, 2015 in the 8X8 case; 7 pp.
Exhibit S-24, Supplemental Invalidity Claim Chart for U.S. Pat. No. 7,636,428 Based on U.S. Pat. No. 8,069,205 ("Voois") (filed Jun. 16, 2000), to Defendant 8X8's Supplemental Invalidity Contentions Exemplified Using the Asserted Claims of the '428 and '588 (& '910) Patents, filed Jan. 15, 2015 in the 8X8 case; 9 pp.
Exhibit S-25, Supplemental Invalidity Claim Chart for U.S. Pat. No. 8,064,588 Based on U.S. Pat. No. 6,373,517 ("Davis") (filed Apr. 12, 2000), to Defendant 8X8's Supplemental Invalidity Contentions Exemplified Using the Asserted Claims of the '428 and '588 (& '910) Patents, filed Jan. 15, 2015 in the 8X8 case; 7 pp.
Exhibit S-26, Supplemental Invalidity Claim Chart for U.S. Pat. No. 8,064,588 Based on U.S. Pat. No. 6,124,882 ("Voois") (filed Jan. 9, 1998), to Defendant 8X8's Supplemental Invalidity Contentions Exemplified Using the Asserted Claims of the '428 and '588 (& '910) Patents, filed Jan. 15, 2015 in the 8X8 case; 7 pp.
Exhibit S-27, Supplemental Invalidity Claim Chart for U.S. Pat. No. 8,064,588 Based on U.S. Pat. No. 6,226,031 ("Barraclough") (filed Oct. 22, 1998), to Defendant 8X8's Supplemental Invalidity Contentions Exemplified Using the Asserted Claims of the '428 and '588 (& '910) Patents, filed Jan. 15, 2015 in the 8X8 case; 6 pp.
Exhibit S-28, Supplemental Invalidity Claim Chart for U.S. Pat. No. 8,064,588 Based on U.S. Pat. No. 7,218,721 "Vincent" (including its underlying U.S. Appl. No. 61/345,258, filed Jan. 2, 2002), to Defendant 8X8's Supplemental Invalidity Contentions Exemplified Using the Asserted Claims of the '428 and '588 (& '910) Patents, filed Jan. 15, 2015 in the 8X8 case; 6 pp.
Exhibit S-29, Supplemental Invalidity Claim Chart for U.S. Pat. No. 8,064,588 Based on U.S. Pat. No. 7,394,803 ("Petit-Huguenin") (filed Sep. 28, 2001), to Defendant 8X8's Supplemental Invalidity Contentions Exemplified Using the Asserted Claims of the '428 and '588 (& '910) Patents, filed Jan. 15, 2015 in the 8X8 case; 6 pp.
Exhibit S-30, Supplemental Invalidity Claim Chart for U.S. Pat. No. 8,064,588 Based on U.S. Pat. No. 7,202,884 ("Barraclough") (filed Jun. 20, 2001) (including its underlying U.S. Appl. No. 60/213,048, filed Jun. 21, 2000), to Defendant 8X8's Supplemental Invalidity Contentions Exemplified Using the Asserted Claims of the '428 and '588 (& '910) Patents, filed Jan. 15, 2015 in the 8X8 case; 5 pp.
Exhibit S-31, Supplemental Invalidity Claim Chart for U.S. Pat. No. 8,064,588 Based on U.S. Pat. No. 8,069,205 ("Voois") (filed Jun. 16, 2000), to Defendant 8X8's Supplemental Invalidity Contentions Exemplified Using the Asserted Claims of the '428 and '588 (& '910) Patents, filed Jan. 15, 2015 in the 8X8 case; 8 pp.
Exhibit S-50, Supplemental Invalidity Claim Chart for U.S. Pat. No. 7,397,910 Based on U.S. Pat. No. 7,092,379 ("Singh") (filed Oct. 30, 1996), to Defendant 8X8's Supplemental Invalidity Contentions Exemplified Using the Asserted Claims of the '428 and '588 (& '910) Patents, filed Jan. 15, 2015 in the 8X8 case; 5 pp.
Defendant 8X8's Supplemental Invalidity Contentions Exemplified Using the Asserted Claims of the '591 and '188 Patents, filed Jan. 20, 2015 in the 8X8 case; 5 pp.
Exhibit S-35, Supplemental Invalidity Claim Chart for U.S. Pat. No. 8,351,591 Based on U.S. Pat. No. 7,218,721 "Vincent" (including its underlying U.S. Appl. No. 61/345,258, filed Jan. 2, 2002), to Defendant 8X8's Supplemental Invalidity Contentions Exemplified Using the Asserted Claims of the '591 and '188 Patents, filed Jan. 20, 2015 in the 8X8 case; 8 pp.
Exhibit S-36, Supplemental Invalidity Claim Chart for U.S. Pat. No. 8,351,591 Based on U.S. Pat. No. 7,394,803 ("Petit-Huguenin") (filed Sep. 28, 2001), to Defendant 8X8's Supplemental Invalidity Contentions Exemplified Using the Asserted Claims of the '591 and '188 Patents, filed Jan. 20, 2015 in the 8X8 case; 9 pp.
Exhibit S-37, Supplemental Invalidity Claim Chart for U.S. Pat. No. 8,351,591 Based on U.S. Pat. No. 7,202,884 ("Barraclough") (filed Jun. 20, 2001) (including its underlying U.S. Appl. No. 61/213,048, filed Jun. 21, 2000), to Defendant 8X8's Supplemental Invalidity Contentions Exemplified Using the Asserted Claims of the '591 and '188 Patents, filed Jan. 20, 2015 in the 8X8 case; 8 pp.
Exhibit S-38, Supplemental Invalidity Claim Chart for U.S. Pat. No. 8,351,591 Based on U.S. Pat. No. 8,069,205 ("Voois") (filed Jun. 16, 2000), to Defendant 8X8's Supplemental Invalidity Contentions Exemplified Using the Asserted Claims of the '591 and '188 Patents, filed Jan. 20, 2015 in the 8X8 case; 9 pp.
Exhibit S-42, Supplemental Invalidity Claim Chart for U.S. Pat. No. 7,822,188 Based on U.S. Pat. No. 7,218,721 "Vincent" (including its underlying U.S. Appl. No. 61/345,258, filed Jan. 2, 2002), to Defendant 8X8's Supplemental Invalidity Contentions Exemplified Using the Asserted Claims of the '591 and '188 Patents, filed Jan. 20, 2015 in the 8X8 case; 13 pp.
Exhibit S-43, Supplemental Invalidity Claim Chart for U.S. Pat. No. 7,822,188 Based on U.S. Pat. No. 7,394,803 ("Petit-Huguenin") (filed Sep. 28, 2001), to Defendant 8X8's Supplemental Invalidity

(56) References Cited

OTHER PUBLICATIONS

Contentions Exemplified Using the Asserted Claims of the '591 and '188 Patents, filed Jan. 20, 2015 in the 8X8 case; 13 pp.
Exhibit S-44, Supplemental Invalidity Claim Chart for U.S. Pat. No. 7,822,188 Based on U.S. Pat. No. 7,202,884 ("Barraclough") (filed Jun. 20, 2001) (including its underlying U.S. Appl. No. 61/213,048, filed Jun. 21, 2000), to Defendant 8X8's Supplemental Invalidity Contentions Exemplified Using the Asserted Claims of the '591 and '188 Patents, filed Jan. 20, 2015 in the 8X8 case; 8 pp.
Exhibit S-45, Supplemental Invalidity Claim Chart for U.S. Pat. No. 7,822,188 Based on U.S. Pat. No. 8,069,205 ("Voois") (filed Jun. 16, 2000), to Defendant 8X8's Supplemental Invalidity Contentions Exemplified Using the Asserted Claims of the '591 and '188 Patents, filed Jan. 20, 2015 in the 8X8 case; 13 pp.
Defendant 8X8's Supplemental Invalidity Contentions (Feb. 11, 2015) Relative to Callwave's Current Assertions of the Patents-In-Suit, filed Feb. 11, 2015 in the 8X8 case; 6 pp.
Defendant 8X8's Supplemental Invalidity Contentions With Supplemental Basis Under 35 U.S.C. § 112, filed Feb. 25, 2015 in the 8X8 case; 16 pp.
Defendant 8X8's Further Supplemental Invalidity Contentions Against Callwave's Patents-In-Suit Based on 8X8's U.S. Pat. 7,035,935, filed Mar. 11, 2015 in the 8X8 case; 6 pp.
Exhibit S-60, Supplemental Invalidity Claim Chart for U.S. Pat. No. 7,397,910, Based on U.S. Pat. No. 7,035,935 ("Voois") (filed Jun. 13, 2001) and based on U.S. Appl. No. 60/212,159 (filed Jun. 16, 2000), to Defendant 8X8's Further Supplemental Invalidity Contentions Against Callwave's Patents-In-Suit Based on 8X8's U.S. Pat. 7,035,935, filed Mar. 11, 2015 in the 8X8 case; 5 pp.
Exhibit S-61, Supplemental Invalidity Claim Chart for U.S. Pat. No. 7,822,188, Based on U.S. Pat. No. 7,035,935 ("Voois" or "Voois-2") (filed Jun. 13, 2001), U.S. Appl. No. 60/212,159 (filed Jun. 16, 2000), to Defendant 8X8's Further Supplemental Invalidity Contentions Against Callwave's Patents-In-Suit Based on 8X8's U.S. Pat. 7,035,935, filed Mar. 11, 2015 in the 8X8 case; 13 pp.
Exhibit S-62, Supplemental Invalidity Claim Chart for U.S. Pat. No. 8,351,591, Based on U.S. Pat. No. 7,035,935 ("Voois") (filed Jun. 13, 2001), U.S. Appl. No. of 60/212,159 (filed Jun. 16, 2000), to Defendant 8X8's Further Supplemental Invalidity Contentions Against Callwave's Patents-InSuit Based on 8X8's U.S. Pat. No. 7,035,935, filed Mar. 11, 2015 in the 8X8 case; 9 pp.
Exhibit S-63, Supplemental Invalidity Claim Chart for U.S. Pat. No. 7,636,428, Based on U.S. Pat. No. 7,035,935 ("Voois" or "Voois-2") (filed Jun. 13, 2001) and based on U.S. Appl. No. 60/212,159 (filed Jun. 16, 2000), to Defendant 8X8's Further Supplemental Invalidity Contentions Against Callwave's Patents-In-Suit Based on 8X8's U.S. Pat. No. 7,035,935, filed Mar. 11, 2015 in the 8X8 case; 9 pp.
Exhibit S-64, Supplemental Invalidity Claim Chart for U.S. Pat. No. 8,064,588, Based on U.S. Pat. No. 7,035,935 ("Voois" or "Voois-2") (filed Jun. 13, 2001) and based on U.S. Appl. No. 60/212,159 (filed Jun. 16, 2000), to Defendant 8X8's Further Supplemental Invalidity Contentions Against Callwave's Patents-In-Suit Based on 8X8's U.S. Pat. No. 7,035,935, filed Mar. 11, 2015 in the 8X8 case; 7 pp.
Defendant 8X8's Further Supplemental Invalidity Contentions Against Each of the Prosecuted Patents-In-Suit Based on Callwave's Belatedly-Produced Prior Art, filed Mar. 12, 2015 in the 8X8 case; 6 pp.
Hansson, A., Phone Doubler—A step towards integrated Internet and telephone communities (1997).
M.I.T. Lincoln Laboratory Network Speech Systems Technology Program, Annual Report to the Defense Communications Agency, Feb. 1982.
Witkowsky, IP Telephone Design and Implementation Issues (1998).
Defendant's (Google Inc.) Fifth Supplemental Invalidity Contentions, dated Jun. 22, 2015, in the following cases pending in the United States District Court, for the District of Delaware: *CallWave Communications, LLC v. At&T Mobility, LLC, and Google Inc.*, Case No. C.A. No. 12-1701-RGA; *CallWave Communications, LLC v. Google Inc.*, Case No. C.A. 12-1702-RGA; and *CallWave Communications, LLC, v. Verizon Services Corp., et al.*, Case No. C.A. No. 12-1704-RGA (hereinafter referred to as "Defendant's Fifth Supplemental Invalidity Contentions"); 8 pp.
Exhibit Burger '660 filed on Jun. 22, 2015 with Defendant's Fifth Supplemental Invalidity Contentions, *Invalidity Claim Charts for U.S. Pat. No. 7,397,901; 8,325,901; and 7,555,110 Based on U.S. Pat No. 6,353,660 ("Burger")*; 94 pp.
Exhibit E-11 filed on Jun. 22, 2015 with Defendant's Fifth Supplemental Invalidity Contentions, *Invalidity Chart for U.S. Pat. No. 7,555,110 Based on Panasonic Cordless Telephone Answering System KX-T4400*; 19 pp.
Exhibit F-10 filed on Jun. 22, 2015 with Defendant's Fifth Supplemental Invalidity Contentions, *Invalidity Chart for U.S. Pat. No. 8,325,901 Based on Panasonic Cordless Telephone Answering System KX-T4400*; 24 pp.
Exhibit G-11 filed on Jun. 22, 2015 with Defendant's Fifth Supplemental Invalidity Contentions, *Invalidity Chart for U.S. Pat. No. 7,397,910 Based on Panasonic Cordless Telephone Answering System KX-T4400*; 67 pp.
Exhibit A-35 filed on Jun. 22, 2015 with Defendant's Fifth Supplemental Invalidity Contentions, *Invalidity of U.S. Pat. No. 7,822,188 Based on Session Initiation Protocol Specifications*; 19 pp.
Schulzrinne, Henning; *SIP for Mobile Applications;* Dept. of Computer Science, Columbia University, New York, NY; VON Developer's Conference Summer 2000 (Boston); Jul. 18, 2000—The Road Ahead; Bates Nos. DEF-CP-INV-00008088-8104; 17 pp.
Rosenberg, et al.; *Best Current Practices for Third Party Call Control (3pcc) in the Session Initiation Protocol (SIP)*; Network Working Group, © The Internet Society (2004); Bates Nos. Def-CP-INV-00007109-7139; 31 pp.
Johnston, et al.; *Session Initiation Protocol Service Examples, draft-ietf-sipping-service-examples-05*, SIPPING Working Group, © The Internet Society (2003); Bates Nos. DEF-CP-INV-00007140-7305; 166 pp.
Boulton, et al.; *Best Current Practices for NAT Traversal for SIP, draft-ietf-sipping-nat-scenarios-02*, SIPPING Working Group, © The Internet Society (2004); Bates Nos. DEF-CP-INV-00007306-7345; 40 pp.
Rosenberg, J.; *Interactive Connectivity Establishment (ICE): A Methodology for Network Address Translator (NAT) Traversal for Offer/Answer Protocols, draft-ietf-mmusic-ice-05*; MMUSIC, © The Internet Society (2005); Bates Nos. DEF-CP-INV-00007346-7393; 48 pp.
Operating Instructions Manual for the Panasonic Cordless Telephone Answering System, Model No. KX-T4400; Panasonic Company; may be 1994 or earlier, Bates Nos. DEF-CP-INV-00007394-7471; 78 pp.
Magazine Article/Advertisement, *Tapeless Two-Step New Dance in Cordless Game; Twice Magazine*, Jan. 4, 1993, p. 74; Bates Nos. DEF-CP-INV-00007472-7473; 2 pp.
Lennox, et al.; *Call Processing Language (CPL): A Language for User Control of Internet Telephony Services;* Network Working Group, © The Internet Society (2004); Bates Nos. DEF-CP-IMV-00007474-7542; 69 pp.
Rosenberg, et al.; *SIP: Session Initiation Protocol;* Network Working Group, © The Internet Society (2002); Bates Nos, DEF-CP-INV-00007543-7811; 269 pp.
Rosenberg, et al.; *STUN—Simple Traverrsal of User Datagram Protocol (UDP) Through Network Address Translators (NATs)*; Network Working Group, © The Internet Society (2003); Bates Nos. DEF-CP-INV-00007812-7858; 47 pp.
Rosenberg, et al.; *Traversal Using Relay (NAT (TURN), draft-rosenberg-midcom-turn-05*; MIDCOM, © Tthe Internet Society (2004); Bates Nos. DEF-CP-IMV-00007859-7897; 39 pp.
Technical Specification Booklet ETSI TS 123 228, V5.4,1 (2002-04), Universal Mobile Telecommunications System (UMTS); IP Multimedia Subsystem (IMS); Stage 2 (3GPP TS 23.228 version 5.4.1 Release 5); ETSI © European Telecommunications Standards Institute 2002; Bates Nos. DEF-CIP-INV-00007899-8047; 150 pp.
*Popular Photography* Magazine; Jun. 1993, vol. 57, No. 2; cover page; pp. 5-6, p. 109; Bates Nos. DEF-CP-INV-00008080-8083; 4 pp.
*Popular Photography* Magazine; Sep. 1993, vol. 57, No. 5; cover page; pp. 1, 2, 125; Bates Nos. DEF-CP-INV-00008084-8087; 4 pp.

(56) References Cited

OTHER PUBLICATIONS

Clifford J. Weinstein, et al., Experience with Speech Communication in Packet Networks, IEEE Journal on Selected Areas in Communications, vol. SAC-1, No. 6 (Dec. 1983); 18 pp.

Martin P. Clark, Networks and Telecommunications—Design and Operation, Grand Metropolitan, UK, John Wiley & Sons (1991); 22 pp.

Tarek N. Saadawi, et al., Fundamentals of Telecommunication Networks, Wiley Series in Telecommunications and Signal Processing, John Wiley & Sons (1994); 497 pp.

Telecordia Technologies, Intelligent Internet—Convergence of Internet and Intelligent Network, Intelligent Network Workshop, Cape Town, South Africa (May 2000); 11 pp.

Defendants' Third Supplemental Invalidity Contentions, filed Apr. 27, 2015, in the matters (1) *Callwave Communications, LLC v. AT&T Mobility, LLC, and Google Inc.*, Case No. C.A. 12-1701-RGA; (2) *Callwave Communications, LLC v. Sprint Spectrum L.P., Sprint Communications Company L.P., and Google Inc.*, Case No. C.A. No. 12-1702-RGA; (3) *Callwave Communications, LLC v. Verizon Services Corp., Cellco Partnership, D.B.A. Verizon Wireless, and Google Inc.*, Case No. C.A. No. 12-1704-RGA; and (4) *Broadsoft, Inc. v. Callwave Communications, LLC*, Case No. C.A. No. 13-711-RGA (hereinafter collectively called the "Callwave/AT&T/Sprint/Verizon/Broadsoft cases"); all in the United States District Court for the District of Delaware; 9 pp.

Exhibit A-09, Supplemental Invalidity Claim Chart for U.S. Pat. No. 7,822,188 Based on U.S. Pat. No. 6,144.667 ("Doshi"), to Defendants' Third Supplemental Invalidity Contentions, filed Apr. 27, 2015 in the Callwave/AT&T/Sprint/Verizon/Broadsoft cases; 32 pp.

Exhibit A-29, Supplemental Invalidity Claim Chart for U.S. Pat. No. 7,822,188 Based on U.S. Pat. No. 6,574.328 ("Wood '328"), to Defendants' Third Supplemental Invalidity Contentions, filed Apr. 27, 2015 in the Callwave/AT&T/Sprint/Verizon/Broadsoft cases; 30 pp.

Exhibit A-32, Initial Invalidity Claim Chart for U.S. Pat. No. 7,822,188 Based on U.S. Pat. No. 7,512,225 ("Borthwick"), to Defendants' Third Supplemental Invalidity Contentions, filed Apr. 27, 2015 in the Callwave/AT&T/Sprint/Verizon/Broadsoft cases; 26 pp.

Exhibit A-33, Initial Invalidity Claim Chart for U.S. Pat. No. 7,822,188 Based on the Session Initiation Protocol Service examples Memo (Feb. 2004), to Defendants' Third Supplemental Invalidity Contentions, filed Apr. 27, 2015 in the Callwave/AT&T/Sprint/Verizon/Broadsoft cases; 56 pp.

Exhibit D-19, Initial Invalidity Claim Chart for U.S. Pat. No. 7,636,428 Based on U.S. Pat. No. 6,621,800 ("Klein '800"), to Defendants' Third Supplemental Invalidity Contentions, filed Apr. 27, 2015 in the Callwave/AT&T/Sprint/Verizon/Broadsoft cases; 45 pp.

Exhibit E-06, Initial Invalidity Claim Chart for U.S. Pat. No. 7,555,110 Based on U.S. Pat. No. 6,621.800 ("Klein '800"), to Defendants' Third Supplemental Invalidity Contentions, filed Apr. 27, 2015 in the Callwave/AT&T/Sprint/Verizon/Broadsoft cases; 16 pp.

Exhibit F-05, Initial Invalidity Claim Chart for U.S. Pat. No. 8,325,901 Based on U.S. Pat. No. 6,621,800 ("Klein '800"), to Defendants' Third Supplemental Invalidity Contentions, filed Apr. 27, 2015 in the Callwave/AT&T/Sprint/Verizon/Broadsoft cases; 19 pp.

Exhibit G-06, Initial Invalidity Claim Chart for U.S. Pat. No. 7,397,910 Based on U.S. Pat. No. 6,621,800 ("Klein '800"), to Defendants' Third Supplemental Invalidity Contentions, filed Apr. 27, 2015 in the Callwave/AT&T/Sprint/Verizon/Broadsoft cases; 42 pp.

Annual Report to the Defense Communications Agency; Defense Switched Network Technology and Experiments Program, Massachusetts Institute of Technology, Lincoln Laboratory; for the period Oct. 1, 1982-Sep. 30, 1983; issued Feb. 29, 1984; 19 pp.; Bates Nos. DEF-CP-INV-00006151 to DEF-CP-INV-00006169.

Cohen, Danny; Specifications for the Network Voice Protocol (NVP) and Appendix 1: The Definition of Tables—Set—#1 (for LPC) and Appendix 2: Implementation Recommendations; DD Nov 77; Jan. 29, 1976; 34 pp.; Bates Nos. DWD-CP-INV-00006170 to DEF-CP-INV-00006203.

Cohen, et al.; A Network Voice Protocol NVP-II; USC/ISI, Marina del Rey, CA and Lincoln Laboratory, Massachusetts Institute of Technology, Lexington, MA; Apr. 1, 1981; 75 pp.; Bates Nos. DEF-CP-INV-00006204 to DEF-CP-INV-00006278.

Forgie, James W.; ST—A Proposed Internet Stream Protocol; M.I.T. Lincoln Laboratory; Sep. 7, 1979; 36 pp.; Bates Nos. DEF-CP-INV-00006279 to DEF-CP-INV-00006314.

Casner, et al.; Experimental Internet Stream Protocol, Version 2 (ST-II); Network Working Group/CIP Working Group; Oct. 1990; 148 pp.; Bates Nos. DEF-CP-INV-00006315 to DEF-CP-INV00006462.

Defendants' First Supplemental Invalidity Contentions on the '970 Patent, filed Feb. 12, 2015, in the matters (1) *Callwave Communications, LLC v. AT&T Mobility, LLC, and Google Inc.*, Case No. C.A. 121701-RGA; (2) *Callwave Communications, LLC v. Sprint Spectrum L.P., Sprint Communications Company L.P., and Google Inc.*, Case No. C.A. No. 12-1702-RGA; (3) *Callwave Communications, LLC v. T-Mobile USA Inc. and Google Inc.*, Case No. C.A. No. 12-1703-RGA; (4) *Callwave Communications, LLC v. Verizon Communications, Inc., Cellco Partnership, D.B.A. Verizon Wireless, and Google Inc.*, Case No. C.A. No. 12-1704-RGA; and (5) *Callwave Communications, LLC v. AT&T Mobility, LLC, Blackberry Limited, and Blackberry Corp.*, Case No. C.A. No. 12-1788-RGA (hereinafter collectively called the "Callwave/AT&T/Sprint/Verizon/Blackberry cases"); all in the United States District Court for the District of Delaware; 35 pp.

Exhibit A-30, U.S. Pat. No. 5,936,572 ("Loomis") Initial Invalidity Claim Chart for U.S. Pat. No. 6,771,970, filed Feb. 12, 2015 in the Callwave/AT&T/Sprint/Verizon/Blackberry cases; 19 pp.

Exhibit A-31, U.S. Pat. No. 5,999,126 ("Ito") Initial Invalidity Claim Chart for U.S. Pat. No. 6,771,970, filed Feb. 12, 2015 in the Callwave/AT&T/Sprint/Verizon/Blackberry cases; 22 pp.

Exhibit A-32, U.S. Pat. No. 5,552,772 ("Janky") Initial Invalidity Claim Chart for U.S. Pat. No. 6,771,970, filed Feb. 12, 2015 in the Callwave/AT&T/Sprint/Verizon/Blackberry cases; 20 pp.

Exhibit A-33, U.S. Pat. No. 6,677,894 ("Sheynblat") Initial Invalidity Claim Chart for U.S. Pat. No. 6,771,970, filed Feb. 12, 2015 in the Callwave/AT&T/Sprint/Verizon/Blackberry cases; 21 pp.

Exhibit A-34, "The Application of a Novel Two-Way Mobile Stellite Communications and Vehicle Tracking System to the Transportation Industry" ("Jacobs") Initial Invalidity Claim Chart for U.S. Pat. No. 6,771,970, filed Feb. 12, 2015 in the Callwave/AT&T/Sprint/Verizon/Blackberry cases; 26 pp.

Leonhardt, et al.; Multi-Sensor Location Tracking; Imperial College, Department of Computing, London, UK; undated; Proceeding MobiCom '98 Proceedings of the 4th annual ACM/IEEE international conference on Mobile computing and networking, pp. 203-214, ©1998, 12 pp.; Bates Nos. 970PA_000983 to 970PA_000993.

Shaw, et al.; Perspectives on an Emerging Discipline; *Software Architecture*; Carnegie Mellon University; ©1996, Prentice Hall, Upper Saddle River, New Jersey; 261 pp.; Bates Nos. 970PA_001307 to 970PA_001567.

Memorandum Opinion (Document 393) filed Jun. 3, 2015 in the United States District Court, for the District of Delaware, in the following cases: (1) *CallWave Communications, LLC v. AT&T Mobility, LLC, et al.*, Civil Action No. 12-1701-RGA; (2) *CallWave Communications, LLC v. Sprint spectrum L.P., et al.*, Civil Action No. 12-1702-RGA; (3) *CallWave communications, LLC v. Verizon Services Corp., et al.*, Civil Action No. 12-1704-RGA; and (4) *Broadsoft, Inc. v. CallWave Communications, LLC*, Civil Action No. 13-711-RGA; Page ID #s 9603-9621; 19 pp.

Defendants' (Google Inc. and Broadsoft, Inc.) Fourth Supplemental Invalidity Contentions, dated May 22, 2015, in the following cases pending in the United States District Court, for the District of Delaware: *Callwave Communications, LLC v. AT&T Mobility, LLC, and Google Inc.*, Case No. C.A. No. 12-1701-RGA; *Callwave Communications, LLC v. Spring Nextel Corp. and Google Inc.*, Case No. C.A. 12-1702-RGA; and *Broadsoft, Inc. v. Callwave Communica-

(56) References Cited

OTHER PUBLICATIONS tions, LLC, Case No. C.A. No. 13-711-RGA (hereinafter referred to as "Defendants' Fourth Supplemental Invalidity Contentions"); 10 pp.
Corrected Exhibit A-33 filed on May 22, 2015 with Defendants' Fourth Supplemental Invalidity Contentions, *Invalidity Claim Chart for U.S. Pat. No. 7,822,188 Based on the Session Initiation Protocol Service examples Memo* (Feb. 2004); 70 pp.
Exhibit A-34 filed on May 22, 2015 with Defendants' Fourth Supplemental Invalidity Contentions, *Initial Invalidity Claim Chart for U.S. Pat. No. 7,822,188 Based on U.S. Pat. No. 6,445,694 ("Swartz")*; 32 pp.
Exhibit B-20 filed on May 22, 2015 with Defendants' Fourth Supplemental Invalidity Contentions, Initial *Invalidity Claim Chart for U.S. Pat. No. 8,064,588 Based on U.S. Pat. No. 6,445,694 ("Swartz")*; 19 pp.
Exhibit D-11 filed on May 22, 2015 with Defendants' Fourth Supplemental Invalidity Contentions, *Initial Invalidity Claim Chart for U.S. Pat. No. 7,636,428 Based on U.S. Pat. No. 6,445,694 ("Swartz")*; 11 pp.
Exhibit D-12 filed on May 22, 2015 with Defendants' Fourth Supplemental Invalidity Contentions, *Initial Invalidity Claim Chart for U.S. Pat. No. 7,636,428 Based on U.S. Pat. No. 6,041,103 ("La Porta")*; 36 pp.
Exhibit D-13 filed on May 22, 2015 with Defendants' Fourth Supplemental Invalidity Contentions, *Initial Invalidity Claim Chart for U.S. Pat. No. 7,636,428 Based on U.S. Pat. No. 6,266,524 ("Dee")*; 26 pp.
Exhibit D-14 filed on May 22, 2015 with Defendants' Fourth Supplemental Invalidity Contentions, *Initial Invalidity Claim Chart for U.S. Pat. No. 7,636,428 Based on U.S. Pat. No. 6,310,939 ("Varney")*; 23 pp.
Exhibit E-07 filed on May 22, 2015 with Defendants' Fourth Supplemental Invalidity Contentions, *Initial Invalidity Claim Chart for U.S. Pat. No. 7,555,110 Based on U.S. Pat. No. 6,041,103 ("La Porta")*; 14 pp.
Exhibit E-08 filed on May 22, 2015 with Defendants' Fourth Supplemental Invalidity Contentions, *Initial Invalidity Claim Chart for U.S. Pat. No. 7,555,110 Based on U.S. Pat. No. 6,266,524 ("Dee")*; 12 pp.
Exhibit E-09 filed on May 22, 2015 with Defendants' Fourth Supplemental Invalidity Contentions, *Initial Invalidity Claim Chart for U.S. Pat. No. 7,555,110 Based on U.S. Pat. No. 6,310,939 ("Varney")*; 10 pp.
Exhibit F-06 filed on May 22, 2015 with Defendants' Fourth Supplemental Invalidity Contentions, *Initial Invalidity Claim Chart for U.S. Pat. No. 8,325,901 Based on U.S. Pat. No. 6,041,103 ("La Porta")*; 17 pp.
Exhibit F-07 filed on May 22, 2015 with Defendants' Fourth Supplemental Invalidity Contentions, *Initial Invalidity Claim Chart for U.S. Pat. No. 8,325,901 Based on U.S. Pat. No. 6,266,524 ("Dee")*; 18 pp.
Exhibit F-08 filed on May 22, 2015 with Defendants' Fourth Supplemental Invalidity Contentions, *Initial Invalidity Claim Chart for U.S. Pat. No. 8,325,901 Based on U.S. Pat. No. 6,310,939 ("Varney")*; 17 pp.
Exhibit G-07 filed on May 22, 2015 with Defendants' Fourth Supplemental Invalidity Contentions, *Initial Invalidity Claim Chart for U.S. Pat. No. 7,397,910 Based on U.S. Pat. No. 6,041,103 ("La Porta")*; 36 pp.
Exhibit G-08 filed on May 22, 2015 with Defendants' Fourth Supplemental Invalidity Contentions, *Initial Invalidity Claim Chart for U.S. Pat. No. 7,397,910 Based on U.S. Pat. No. 6,266,524 ("Dee")*; 30 pp.
Exhibit G-09 filed on May 22, 2015 with Defendants' Fourth Supplemental Invalidity Contentions, *Initial Invalidity Claim Chart for U.S. Pat. No. 7,397,910 Based on U.S. Pat. No. 6,310,939 ("Varney")*; 24 pp.
Exhibit NBX1 filed on May 22, 2015 with Defendants' Fourth Supplemental Invalidity Contentions, *Initial Invalidity Claim Chart for U.S. Pat. No. 7,555,110 Based on the NBX System*; 25 pp.
Exhibit NBX2 filed on May 22, 2015 with Defendants' Fourth Supplemental Invalidity Contentions, *Initial Invalidity Claim Chart for U.S. Pat. No. 7,822,188 Based on the NBX System*; 47 pp.
Exhibit NBX3 filed on May 22, 2015 with Defendants' Fourth Supplemental Invalidity Contentions, *Initial Invalidity Claim Chart for U.S. Pat. No. 7,636,428 Based on the NBX System*; 54 pp.
Exhibit NBX4 filed on May 22, 2015 with Defendants' Fourth Supplemental Invalidity Contentions, *Initial Invalidity Claim Chart for U.S. Pat. No. 8,064,588 Based on the NBX System*; 21 pp.
Exhibit NBX5 filed on May 22, 2015 with Defendants' Fourth Supplemental Invalidity Contentions, *Initial Invalidity Claim Chart for U.S. Pat. No. 8,325,901 Based on the NBX System*; 31 pp.
Exhibit NBX6 filed on May 22, 2015 with Defendants' Fourth Supplemental Invalidity Contentions, *Initial Invalidity Claim Chart for U.S. Pat. No. 7,397,910 Based on the NBX System*; 67 pp.
Defendant Fonality, Inc.'s Second Supplemental Invalidity Contentions filed Jun. 10, 2015 in the case of *CallWave Communications, LLC v. Fonality, Inc.*, in the United States District Court for the District of Delaware, C.A. No. 14-cv-398-RGA; 9 pp.
Exhibit B37, Initial Invalidity Claim Chart for U.S. Pat. No. 8,064,588 Based on U.S. Pat. No. 6,404,860 (Casellini), filed Jun. 10, 2015 in the case of *Call Wave Communications, LLC v. Fonality, Inc.*, in the United States District Court for the District of Delaware, C.A. No. 14-cv-398-RGA; 30 pp.
Defendants' Second Supplemental Invalidity Contentions, filed Apr. 7, 2015, in the matters (1) *Callwave Communications, LLC v. AT&T Mobility, LLC, and Google Inc.*, Case No. C.A. 12-1701-RGA; (2) *Callwave Communications, LLC v. Sprint Spectrum L.P., Sprint Communications Company L.P., and Google Inc.*, Case No. C.A. No. 12-1702-RGA; (3) *Callwave Communications, LLC v. Verizon Services Corp., Cellco Partnership, D.B.A. Verizon Wireless, and Google Inc.*, Case No. C.A. No. 12-1704-RGA; and (4) *Broadsoft, Inc. v. Callwave Communications, LLC*, Case No. C.A. No. 13-711-RGA (hereinafter collectively called the "Callwave/AT&T/Sprint/Verizon/Broadsoft cases"); all in the United States District Court for the District of Delaware; 7 pp.
Exhibit CCM8, White Paper—"Architecture for Voice, Video and Integrated Data", ©2000 Cisco Systems, Inc., filed Apr. 7, 2015, in the Callwave/AT&T/Sprint/Verizon/Broadsoft cases cited above; 23 pp.

PROCESS FLOW STEPS

401. Calling Party 102 originates call to Called Party Phone Line 114

402. Called Party LEC switch 128 detects Called Party Telephone Line 114 busy

403. Called Party LEC switch 128 forwards the call to the IAM Line/Trunk 118

404. IAM system 124 notifies online Computer 110 of incoming call via Internet 104

405. IAM system 124 answers incoming call from Calling Party 102

406. PSTN 104 establishes 2-way talk path between IAM system 124 and Calling Party 102

407. IAM system 124 plays greeting to Calling Party 124

408. Calling Party 102 can talk over the greeting to Called Party 112

409. IAM system 124 streams Calling Party's 102 audio comments to the online Computer 110

410. IAM system 124 generates tone to signal Calling Party 102 to begin message recording 411. Calling Party 102 begins recording voice message 412. IAM system 124 streams Calling Party's voice message to the online Computer 110

413. Called Party 112 signals IAM system 124 to pickup the call to TALK to the Calling Party using their HOME PC 414. IAM system 124 interrupts Calling Party 102 message recording by generating tone 415. IAM system 124 requests that Calling Party 102 hold while bridging resources are allocated 416. IAM system 124 bridges the Calling Party 102 call with the Called Party 112 call 417. (Normal 2-way conversation between Calling Party telephone 102 and Called Party Computer 110)

418. Calling Party 102 or Called Party 112 terminates call by hanging up

419. IAM system 124 releases bridging resources and signals call completion to second Party
    - Internet 104 control message sent to Called Party computer for display
    - Call release signal sent to PSTN 104 to alert Calling Party Telephone 102

*FIG. 4B*

PROCESS FLOW STEPS

501. Calling Party 102 originates call to Called Party Phone Line 114
502. Called Party LEC switch 128 detects Called Party Telephone Line 114 busy
503. Called Party LEC switch 128 forwards the call to the IAM Line/Trunk 118
504. IAM system 124 notifies online Computer 110 of incoming call via Internet 104
505. IAM system 124 answers incoming call from Calling Party 102
506. PSTN 104 establishes 2-way talk path between IAM system 124 and Calling Party 102
507. IAM system 124 plays greeting to Calling Party 124
508. Calling Party 102 can talk over the greeting, to Called Party 112
509. IAM system 124 streams Calling Party's audio comments to the online Computer 110
510. IAM system 124 generates tone to signal Calling Party 102 to begin message recording
511. Calling Party 102 begins recording voice message
512. IAM system 124 streams Calling Party's voice message to the online Computer 110
513. Called Party 112 signals IAM system 124 to pickup the call to TALK to the caller using their HOME PHONE
514. IAM system 124 interrupts Calling Party 102 message recording by generating tone
515. IAM system 124 requests that Calling Party 112 hold while bridging resources are allocated
516. Client application 116 running on Called Party's Computer 110 terminates Internet session (releasing phone Line 114)
517. IAM system 124 originates new call to Called Party telephone 112
518. Called Party 112 answers Incoming call from IAM system 124
519. IAM system 124 announces call to Called Party 112
520. IAM system 124 bridges the Calling Party 102 call with the Called Party 112 call
521. (Normal 2-way conversation between Calling Party Telephone 102 and Called Party Telephone 112)
522. Calling Party 102 or Called Party 112 terminates call by hanging up
523. IAM system 124 releases bridging resources and signals call completion to second Party

*FIG. 5B*

SYSTEMS AND METHODS FOR CALL PROCESSING

PRIORITY CLAIM

This application is a continuation of U.S. patent application Ser. No. 13/922,065, filed Jun. 19, 2013, which is a continuation of U.S. patent application Ser. No. 13/295,830, filed Nov. 14, 2011, now U.S. Pat. No. 8,472,604, which is a continuation of U.S. patent application Ser. No. 12/616,025, filed Nov. 10, 2009, now U.S. Pat. No. 8,064,588, which is a continuation of U.S. patent application Ser. No. 11/374,390, filed Mar. 13, 2006, now U.S. Pat. No. 7,636,428, which is a continuation of U.S. patent application Ser. No. 10/439,601, filed May 16, 2003, now U.S. Pat. No. 7,103,167, which claims the benefit under 35 U.S.C. 119(e) of U.S. Provisional Application No. 60/382,257, filed May 20, 2002, the contents of which are incorporated herein by reference in their entirety.

BACKGROUND OF THE INVENTION

1. Field of the Invention

The present invention relates generally to telecommunications, and in particular to systems and methods for screening telephone calls.

2. Description of the Related Art

Conventional telephone systems often offer a Telephone Answering Service (TAS) that redirects incoming calls encountering a ring-no-answer condition, a busy condition, or a do-not-disturb condition, to a network voice messaging system on which the caller can record a message for the called party. The called party is then provided with a Message-Waiting-Indicator (MWI). In many conventional systems, the MWI notification is in the form of a stutter dial tone or a flashing light on the called party's telephone. Upon detection of this indicator, the called party can dial into the voice messaging platform to retrieve the recorded message from his/her mailbox.

Alternatively, many residential telephone customers equip their homes with a Telephone Answering Machine (IAM) that automatically answers their phone and takes a message when an incoming call is not answered within the first three or four ring cycles. The IAM plays the caller's message over its speakers so that the call can be screened and if desired, picked up by the called party to initiate a two-way conversation. If the call is not picked up, the IAM provides a MWI notification, usually by illuminating a lamp on the IAM device. Once again, the called party, upon detection of this indicator, can retrieve the recorded message from his/her mailbox.

The above described two classes of conventional automated telephone call answering solutions have distinct advantages and disadvantages. The TAS handles busy as well as unanswered calls but does not allow message screening. The IAM allows screening of unanswered calls but does not handle busy calls. In addition, neither solution provides a timely notification of calls missed when the phone line is tied up while the called party is surfing the Internet on a dialup connection.

A more recent call answering service called the Internet Answering Machine (IAM), provided by CallWave, Inc., works with the "Call Forward On Busy" feature of the called party's phone line to answer calls while the called party is using the phone line to access the Internet via the called party's computer. Once activated, callers no longer get annoying busy signals when the called party is online. Instead, callers hear a greeting after which they can leave a short message. The caller's phone number and message are transmitted in near real-time to the called party's computer so that the called party can screen the call and optionally choose to interact with the caller during the call. For example, the called party could choose to answer the call, continue screening on an alternate telephone, or request that a telemarketer blocking message be played to the caller.

Some recent TAS systems provide call screening while recording a message from a caller. However, many of these conventional call screening methods disadvantageously only allow a call to be screened using a particular phone line of the called party, which may not be the most desirable phone line for performing the call screening operation. In addition, these conventional methods generally are not capable of providing the called party with the caller's Caller-ID. Further, these conventional methods may not allow calls to be screened while the particular phone is being used by the called party to access the Internet or the like via their computer. Lastly, these services typically require tight coupling with the called party's local telephone switch, thereby limiting the breadth of the serving territory that can be covered by a single system.

SUMMARY OF THE INVENTION

Embodiments of the present invention are directed methods and systems for providing call screening in conjunction with a variety of network-based telephone call answering processes and services.

In one example embodiment, an Internet Answering Machine (IAM) system allows a called party to monitor a message being left by a caller even when the called party is connected to the Internet over a dial-up connection. Calls are forwarded from the called party's line to the IAM system using the called party's local phone company's fixed and variable call forward functions. These functions can include, by way of example, call forwarding on busy, call forwarding on ring-no-answer, and call-forward-all calls (sometimes called do-not-disturb). The IAM system answers the forwarded calls and a plays a greeting to the caller. At the same time, a communication channel is opened with the called party over the public Internet and speech is "streamed" to the called party and played over the speakers of the called party's computer, which may be, by way of example, a personal computer or networked television. With streaming, a client application executing on the called party's computer can start playing the transmitted speech data in substantially or almost real-time, before an entire speech data file of a caller's message has been transmitted. In particular, the Internet channel is opened at the time a call arrives at the call answering system so the called party hears the caller's speech during the playing of the greeting.

If the called party wishes, the called party can instruct the IAM system to pickup the call by linking the called party to the caller. The IAM system interrupts the caller, who may be in the process of leaving a message, by playing a voice prompt, such as "please hold while we connect your call." The call management system causes the called party computer to be disconnected from the Internet, originates a new call from the IAM system to the called party's POTS (plain old telephone service—which refers to the standard telephone service that most homes use) phone, and bridges the two calls together.

In another embodiment, rather than opening a channel over the Internet to the called party's computer, a second call is selectively originated upon the arrival of the forwarded call to a second POTS Public Switched Telephone Network (PSTN) phone line or the called party's wireless/cellular phone. The IAM system determines which of the POTS lines and cellular lines to call and which calls are to be forwarded based on a set of rules defined by the called party. These rules can include online and offline status (Internet presence), telephone presence (called party on the phone line/off the phone line), VIP Caller-ID filtering (calling number), called number, time of day, day of week, and other parameters. When the called party answers, a brief greeting is played and the called party can monitor and interact with the caller as described above.

In still another embodiment, when the call is originated from the IAM system to the POTS phone line or wireless device, the call is originated, using by way of example the SS7 protocol, to the line with the calling party ID of the "original caller". Having the original calling party's number delivered with the outbound call and then displayed on the POTS line or wireless phone display can help the called party decide how to handle the call.

In yet another embodiment, rather than the IAM system receiving only forwarded calls, the called party can selectively publish a unique phone number that terminates calls directly to the IAM system. The called party can monitor and selectively interact with their callers as described above.

In one embodiment, the call screening information is simultaneously multi-cast to multiple telephone and IP devices. Any one of the multi-cast destination devices can directly interact with the caller during the call.

In another embodiment, a method of providing a called party the ability to screen calls comprises: receiving over a switched network at a call manager system a forwarded call from a calling party intended for the called party, wherein signaling information associated with the forwarded call includes the calling party's phone number; playing a greeting to the calling party; originating a second call from the call manager system to the called party, wherein signaling information associated with the second call includes the calling party's phone number so that the second call appears to be originating from the calling party; and bridging the forwarded call with the second call.

In yet another embodiment, a method of processing calls comprises: receiving over a switched network at a call processing system a first call from a caller intended for a called party, wherein the first call includes signaling information having a phone number of the caller; and placing a new call from the call processing system over the switched network to a terminal associated with the called party, the new call including signaling information having at least a selected portion of the phone number of the caller so that the called party can determine the identity of the caller of the first call and thereby screen the caller.

In still another embodiment, a method of providing a called party the ability to selectively accept phone calls comprises: receiving at a call processing system a first call from a calling party intended for the called party, wherein the first call includes at least a first portion of the calling party's phone number; and initiating a second call from the call processing system to the called party, the second call including at least part of the first portion of the calling party's phone number to thereby provide the called party with information related to the identity of the calling party so that the called party can screen the first call.

In one embodiment, a call screening apparatus comprises: a first instruction stored in computer readable memory, the first instruction configured to cause a call from a calling party intended for a called party to be answered; a second instruction stored in computer readable memory, the second instruction configured to play a greeting to the calling party; a third instruction stored in computer readable memory, the third instruction configured to maintain a communication channel over the Internet with a networked computer associated with the called party while the greeting is being played; a fourth instruction stored in computer readable memory, the fourth instruction configured to receive and stream speech from the calling party over the Internet communication channel to the networked computer, wherein the streamed speech is intended to be screened by the called party by the networked computer; a fifth instruction stored in computer readable memory, the fifth instruction configured to receive a command, via the Internet communication channel, from the called party to connect the calling party to the called party; a sixth instruction stored in computer readable memory, the sixth instruction configured to cause the called party's networked computer to go offline; and a seventh instruction stored in computer readable memory, the seventh instruction configured to originate a second call from the call manager system to the called party, and to bridge the calling party's call with the second call.

In another embodiment, a method of providing a called party the ability to screen calls comprises: receiving at a first call processing apparatus a call from a first user for a second user; receiving a voice communication from the first user at the first call processing apparatus; and multi-casting at least a portion of the voice communication to a plurality of client devices at substantially the same time so that the first user's call can be screened.

In still another embodiment, a method of providing a called party the ability to screen calls comprises: receiving at a first call processing apparatus a call from a first user for a second user; and multi-casting a call alert to a plurality of client devices at substantially the same time so that the first user's call can be screened.

BRIEF DESCRIPTION OF THE DRAWINGS

Embodiments of the present invention will now be described with reference to the drawings summarized below. These drawings and the associated description are provided to illustrate example embodiments of the invention, and not to limit the scope of the invention.

FIGS. 4A-4B illustrate a first example call screening process in accordance with the present invention.

FIGS. 5A-5B illustrate a second example call screening process in accordance with the present invention.

Throughout the drawings, like reference numbers are used to refer to items that are identical or functionally similar.

DETAILED DESCRIPTION OF PREFERRED EMBODIMENTS

The present invention provides systems and methods for call screening. As will be described in greater detail below, in one embodiment, an IAM system allows a called party to monitor a message being left by a caller even when the called party is using a phone line to access a computer network, such as the Internet.

Throughout the following description, the term "Web site" is used to refer to a user-accessible network site that implements the basic World Wide Web standards for the coding and transmission of hypertextual documents. These standards currently include HTML (the Hypertext Markup Language) and HTTP (the Hypertext Transfer Protocol). It should be understood that the term "site" is not intended to imply a single geographic location, as a Web or other network site can, for example, include multiple geographically distributed computer systems that are appropriately linked together. Furthermore, while the following description relates to an embodiment utilizing the Internet and related protocols, other networks, such as networked interactive televisions, and other protocols may be used as well. In addition, unless otherwise indicated, the functions described herein are preferably performed by executable code and instructions running on one or more general-purpose computers. However, the present invention can also be implemented using special purpose computers, state machines, and/or hardwired electronic circuits. In addition, a communications line is referred to as "busy" when the communication line is being utilized in such a way that a conventional incoming call will not be connected to the communications line. Thus, for example, if a user is utilizing a conventional line capable of only conducting one of a conventional voice session and a data session, but not both at the same time, for a data session, the line will be busy.

Figure 1:
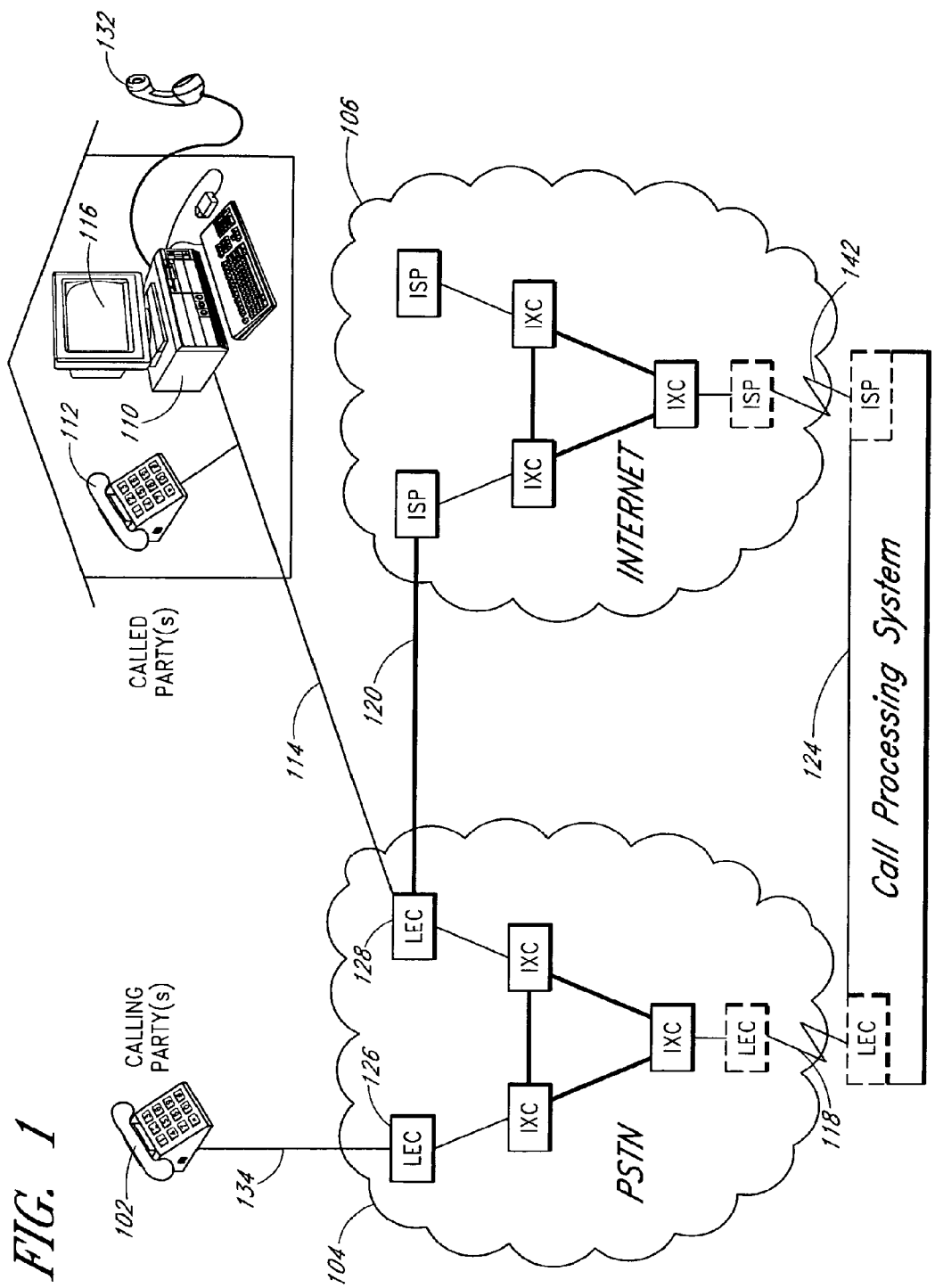
FIG. 1 illustrates an example telecommunications system that can be used in accordance with one embodiment of the present invention.

FIG. 1 illustrates an example telecommunications system that can be used in accordance with the present invention. As illustrated, the telecommunications system includes:

a plurality of user telephone stations 102, 112.

a plurality of user computer terminals 110.

a call processing system 124 that acts as an Internet Answering Machine (IAM) system.

These devices are linked together using various line and trunk circuits to a Public Switched Network (PSTN) 104 and to a common data network, such as the Internet 106.

Figure 2:
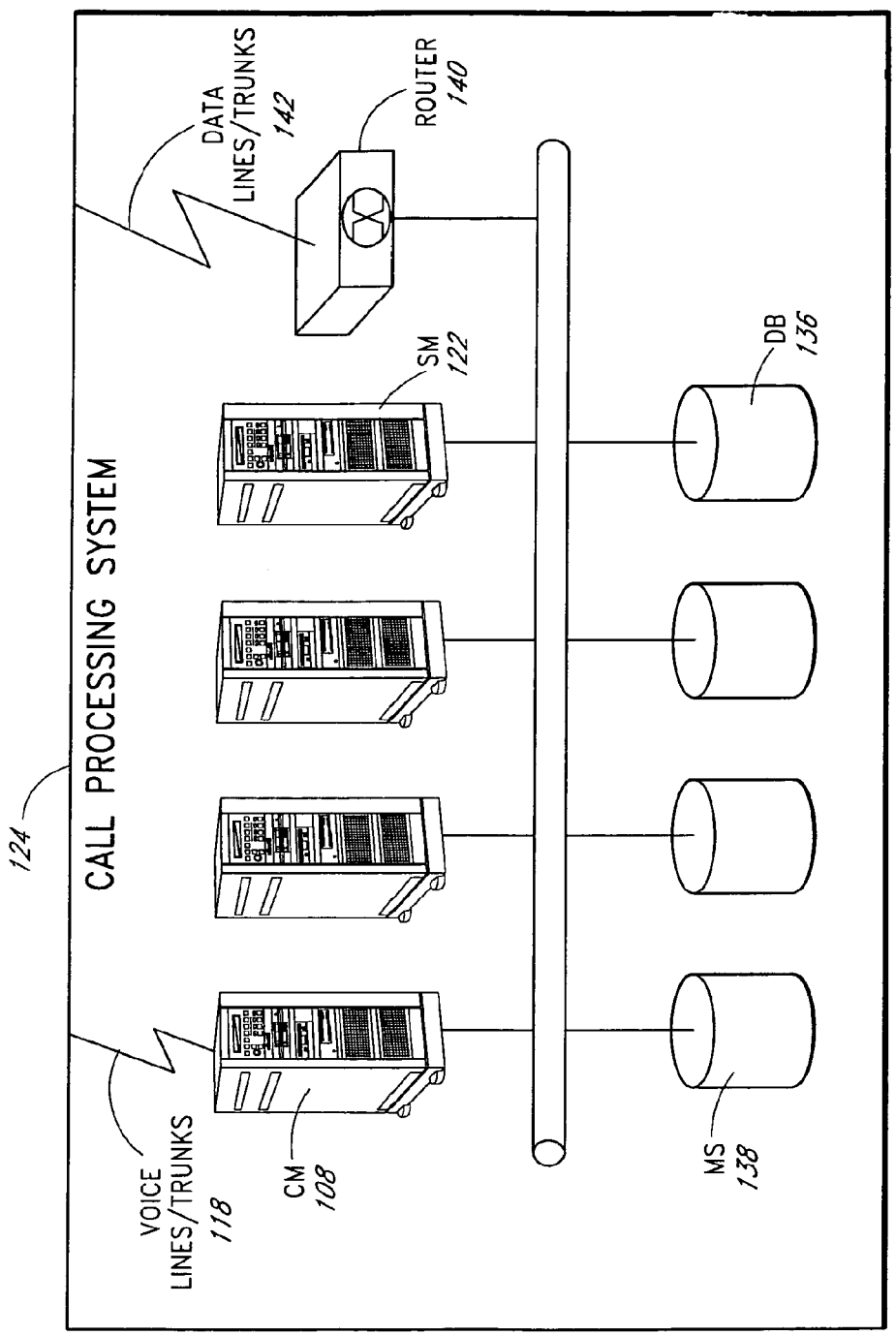
FIG. 2 further details the subsystems that comprise the IAM system depicted in FIG. 1 described above.

FIG. 2 further decomposes the IAM system 124 into its functional components:

a Call Management (CM) subsystem 108, which serves as the interface to the PSTN 104 to manage inbound and outbound telephone calls.

a Router subsystem 140, which serves as the interface to the Internet 106 to manage communications between online IP client devices and the various IAM servers.

an online presence detection Internet Session Management (SM) subsystem 122, which monitors the status of subscriber data terminals to determine availability for call handling services.

a shared Media Storage (MS) subsystem 138, which persistently archives the callers voice messages and the called party/subscriber's personal greeting(s).

an IAM Database (DB) subsystem 136 in which called party/subscriber IAM service parameters are stored.

Theses various subsystems are interconnected via a Local Area Network (LAN) and/or via a Wide Area Network (WAN). Other embodiments of the IAM system 124 are described in U.S. patent application Ser. No. 09/539,375, filed Mar. 31, 2000, now U.S. Pat. No. 6,477,246, the contents of which are incorporated herein in their entirety by reference.

CallWave, Inc. operates one such IAM system. As is well known in the field of Internet telecommunications, an IAM service works with the "Call Forward On Busy" feature of a standard phone line to answer calls while the subscriber is online and is using the phone line to access the Internet. Once activated, callers no longer get annoying busy signals when the subscriber is online. Instead, callers hear a brief greeting after which they can leave a short message. The recording can be streamed in substantially real-time or sent to the subscriber over the Internet within seconds after the recording has completed. Just like a home telephone answering machine, the subscriber can elect to interact with the caller while they are still on the line or can call them back at a later time.

Referring back to FIG. 1, the user telephone stations 102, 112 are respectively connected to local exchange switches 126, 128 via telephone lines 134, 114. The stations 102, 112 can optionally be conventional POTS (Plain Old Telephone Service) telephones or local extensions behind a corporate Private Branch Exchange (PBX).

The telephone stations 102, 112 can be coupled to the same switch or different switches. If the telephone stations 102, 112 are coupled to the same switch, the switch will be local to both the calling and called parties, such as for intra-LATA or local calls. If telephone stations 102, 112 are coupled to different switches, each switch may be local only to one of the parties, as is the case for non-local calls such as inter-LATA (long-distance) calls.

In the illustrated embodiment, the CM subsystem 108 is coupled into the PSTN 104 through voice trunk circuits 118 directly interfacing with the Inter Exchange Carrier's (IXC) circuit switched or packet switched telephony network. Thus, advantageously the IAM system 124 does not have to be directly serviced by the same Local Exchange Carrier's (LEC) switch or PBX as the calling or called terminals 102 and 112. Indeed, the IAM system 124 or its individual subsystem components can be located in a different country than the called and calling parties. In this instance, the IAM system 124 is optionally configured as, or to appear as, a telephone end office and can interface with the PSTN 104 as a Class 5 switch. In other embodiments, the IAM system 124 is locally attached to a LEC switch with a physical line or local trunk interface circuit. This switch may or may not be serving telephone stations 102 and/or 112.

The IAM voice trunk circuits 118 are not limited to a particular signaling convention. For example, the present invention can be utilized with a Common Channel Signaling system, such as Signaling System 7 (SS7), having separate voice/user data and signaling channels. In addition, the present invention can be used with other signaling methods, such as the following trunk-side signaling interfaces: ISDN-PRI; Advanced Intelligent Network; and/or Service Node architectures. Preferably, the selected signaling system provides a suite of call presentation information to the IAM system 124, including one or more of:

ANI—Automatic Number Identification: phone number and privacy indicator of the calling party ("Caller-ID").

DNIS—Dialed Number Identification: phone number of the IAM system's voice trunks 118 that the call was forwarded to.

OCN—Original Called Number Identification: phone number of the original called party (subscriber to the IAM service).

Call Type—Forwarded call due to a BCF, RNA, or DND/CFA condition. In addition, directly dialed inbound calls can be handled as well. In this instance, the caller will be required to implement a second stage of dialing to enter the subscriber's phone number or the subscriber could be assigned a unique personal number that is directly dialed by their callers.

The telephone lines 134, 114 may be shared with one or more computer terminals. For example, telephone terminal 112 shares the telephone line 114 with a computer terminal 110. While in the illustrated example the computer terminal 110 is a personal computer, the computer terminal 110 can be an interactive television, a networked-enabled personal digital assistant (PDA), other IP (Internet Protocol) device, or the like. Alternatively, the computer terminal 110 can be a personal computer having a monitor, keyboard, a mouse, a disk drive, sound card or similar sound reproduction circuitry such as a codec, streaming media playback software, such as the Media Player program available from Microsoft, speakers, and a modem, such as a standard V.90 56K dial-up modem. The modem can optionally be configured to dial-up a number under control of an application, such as a contact manager application or telecommunications client application phone dialer, stored and executing on the computer terminal 110.

The telephone line 114, can be used to establish a dial-up connection for computer terminals, such as terminal 110 via the computer modem, to an Internet Service Provider (ISP) offering dial-in remote access service connections from the PSTN 104 via trunk interface circuits 120. The computer terminal 110 can also be connected to the Internet 106 via a broadband connection, such as a DSL line, a television cable line, or a T1 line.

In addition, the computer terminal 110 can be equipped with a Voice over Internet Protocol (VoIP) software module and a headset or a handset 132, including a microphone and speaker, allowing voice communications to be conducted over a computer network, such as the Internet 106. VoIP communicates information via packet switching, which opens a connection just long enough to send a small packet of data. Each packet includes a destination address informing the network where to send the packet along with the actual voice data payload. If the receiving station is also a VoIP terminal, then when the receiving terminal receives the packets, VoIP software executing on the receiving terminal reassembles the packets into the original data stream. The data stream is then converted to a voice signal. If the receiving station is a conventional telephone, then a VoIP gateway converts the packets into a voice signal that is then connected to the PSTN 104.

In one embodiment, the VoIP process is performed using the H.323 standardized protocol established by the International Telecommunications Union (ITU). Advantageously, H.323 provides specifications for real-time, interactive videoconferencing, data sharing and audio applications such as IP telephony. Alternatively, the Session Initiation Protocol (SIP), established by the Internet Engineering Task Force (IETF), can be used. SIP is generally more efficient than the H.323 protocol as SIP is specifically intended for IP telephony. Alternatively, proprietary protocols could be deployed where multi-vendor interoperability is not required.

Optionally residing and executing on the computer terminal 110 is a communications management Client application 116. The Client application 116 is used to provide enhanced communication services, as discussed in greater detail below. The Client application 116 is connected to and communicates with the IAM system 124 via the Internet 106, other public wide area computer networks, or the like.

The IAM system 124 optionally hosts a Web site used by subscribers of the IAM service to setup and manage their accounts, to view information about incoming calls, and to instruct the IAM system 124 on how to route incoming calls to one or more destination stations. Many of these same functions can be implemented by the Client application 116 as well.

The CM subsystem 108 manages communications with the Client application 116 and with forwarded calls. The CM subsystem 108 can interact with callers and called parties through voice prompts, voice commands, and/or DTMF touch-tone entries. The CM subsystem 108 is optionally configured to perform additional functions, such as acting as a telephone answering system that answers calls, playing outgoing greetings and announcements, recording incoming messages, and bridging calls. In addition, as will be described in greater detail below, the CM subsystem 108 further provides a call screening process.

The SM subsystem 122 monitors the Internet for online IP devices registered to IAM subscribers to determine their availability for handling inbound call screening and call handling services. When a user or subscriber connects to the Internet using, for example, a dial-up ISP, the Client application 116 executing on the subscriber's computer terminal 110 makes the subscriber's online presence known to the IAM system 124. Presence detection can be performed by the SM subsystem 122 polling or pinging the computer terminal 110 via the telecommunications Client application 116, or by the telecommunications Client application 116 transmitting a "Login/I'm alive" message and subsequent periodic "keep alive" messages to the SM subsystem 122. Just prior to the normal termination of the online Internet session, the Client application 116 sends a "Logout" message to the SM subsystem 122. Abnormal Internet session termination conditions are detected by the SM subsystem 122 timing out the expected Client "Keep alive" message.

If, rather than using a dial-up connection, the user or subscriber is using a broadband, always on-connection, such as via a DSL line or cable modem, the Client application 116 becomes active when the computer 110 is turned on or powered up and stays on until the user manually shuts down the Client application 116, or the computer 110 is turned off or powered down.

Figure 4A:
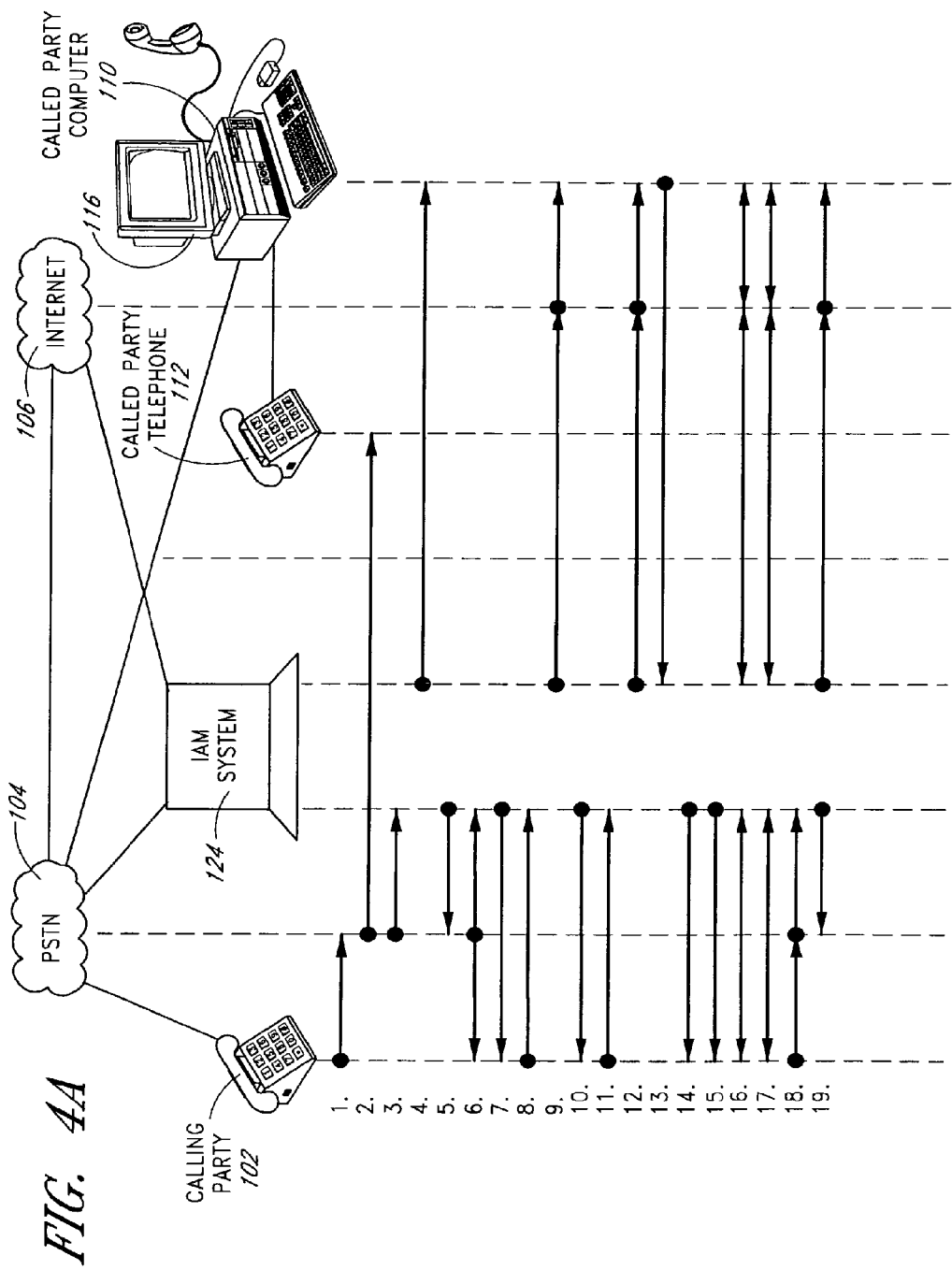

FIGS. 4A-4B illustrate one example embodiment of the present invention, including an abstraction of the previously described telecommunications system and an example call flow diagram. For clarity, the detailed breakout of the network elements and individual subsystems of the IAM system 124 illustrated in FIGS. 1 and 2 are not shown in FIG. 4A. In this example, the calling party is associated with telephone terminal 102 and the called party is associated with terminal 112. In this embodiment, the called party is subscribed to an Internet call answering service that forwards calls to the remote IAM system 124 upon the occurrence of selected conditions, wherein the IAM system 124 transmits a notification to the called party regarding the call.

With reference to FIG. 1, the called party's station 102 has been configured with the local switching system 128 to forward calls on busy (BCF), ring-no-answer (RNA), or do-not-disturb (DND) to the voice trunk circuits 118 connecting the CM subsystem 108 to the PSTN 104. The calling party initiates a call using the calling party telephone station 102 by dialing the number of a called party's phone line 114. The PSTN 104 routes this call to the called party's local switching system 128 causing the called party's telephone terminal 112 to either ring or to forward the call immediately if the line 114 is busy or set to do-not-disturb. If, for example, the called party does not answer within a certain amount of time or after a certain amount of rings, the associated switching system 128 detects a no-answer condition and invokes a switch operation command termed "call forwarding on RNA". The call is then forwarded to a phone number of the CM subsystem 108.

Based at least in part on the OCN of the forwarded call (i.e. the original called party's phone number), the CM subsystem 108 queries the SM subsystem 122 to determine whether the called party is a registered subscriber, is online or offline, and what the subscriber's call handling preferences are. If the called party's computer 110 is online, the CM subsystem 108 opens a communication channel over the public Internet 106 to the Client application 116 running on the called party's computer terminal 110. The Caller-ID of the calling party, if available, and if not designated as private, is transmitted to the Client application 116 and is displayed to the subscriber along with an optional sound notification. The sound notification can be in the form of ringing produced using the called party's computer terminal 110 speakers.

The CM subsystem 108 proceeds to play a greeting to the calling party. The greeting can be a "canned" greeting or a personalized greeting previously recorded by the subscriber and stored in the MS subsystem 138. The CM subsystem 108 records and stores the caller's message in the MS subsystem 138, while simultaneously "streaming" the message speech through the opened Internet channel to the Client application 116 on the called party's computer terminal 110. The Client application 116 uses the computer terminal's codec to play the streamed speech through the speakers on the called party's computer terminal 110, thereby allowing the called party to listen to and screen the call. Optionally, to prevent the calling party from hearing any sounds made by the called party during the screening process, the audio return path over the Internet channel to the CM subsystem 108 is muted.

Figure 3:
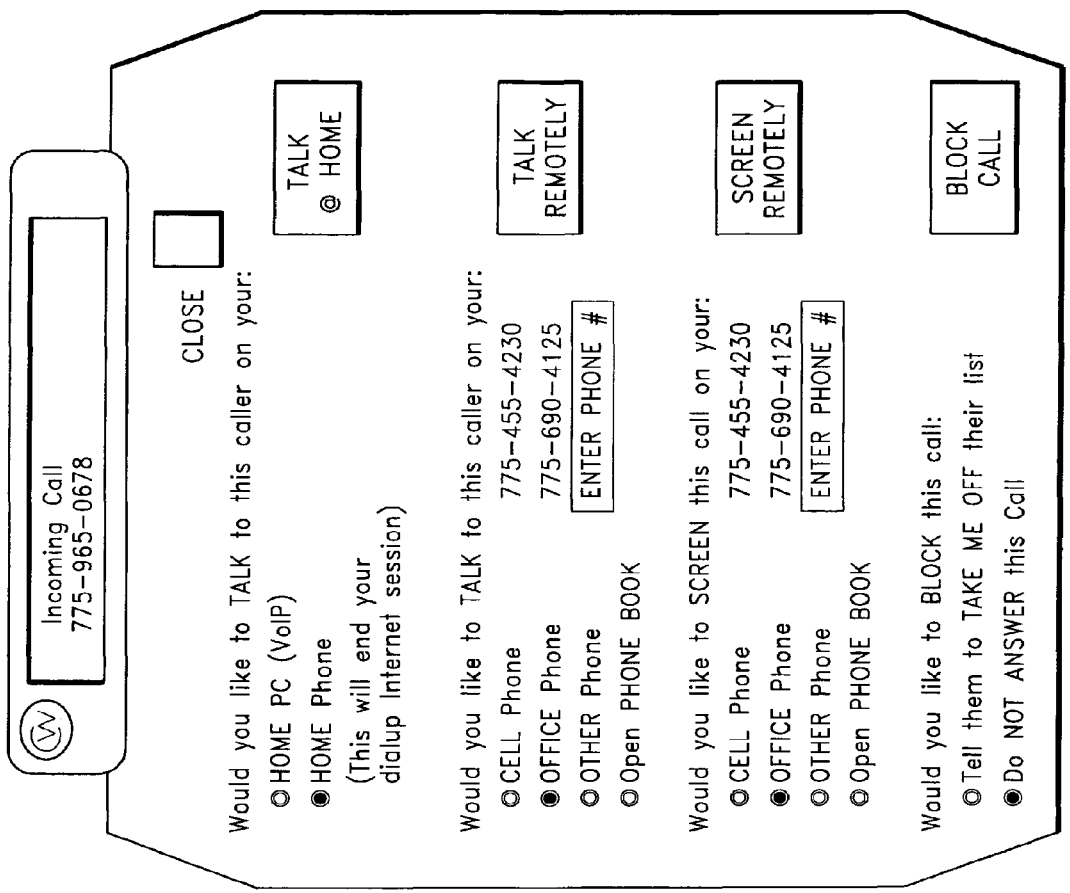
FIG. 3 displays an example menu of call screening/handling options available to the called party during the processing of the inbound call.

While monitoring the Caller-ID of the incoming call, via the Incoming Call field illustrated in FIG. 3 for example, and listening to the corresponding streaming message, the called party is presented with one or more of the following options (see FIG. 3 which depicts an example Client application popup dialog menu):

1. do nothing.
2. pickup (answer) the call to talk to the caller using a software telephone running on the "home PC" (the computer terminal 110).
3. pickup (answer) the call to talk to the caller using the "home phone" on the phone line used to connect to the Internet (the user telephone station 112).
4. pickup (answer) the call to talk to the caller after transferring the call to an alternate phone or to an alternate PC.
5. continue screening the call after transferring it to an alternate phone or to an alternate PC.
6. terminate the call substantially immediately—with a do not disturb message.
7. do not answer the call.

The called party may choose to ignore the incoming call. For example, the call may not have been urgent enough to interrupt what they are doing or the call may have been intended for another member of the household. Under option (1), the called party can close the call handling options dialog box illustrated in FIG. 3 using the "CLOSE" option, thereby informing the IAM system 124 that no further instructions for caller interaction will be forthcoming. Alternatively, the called party, having screened the Caller-ID of the incoming call and/or the associated caller's message, can simply continue doing what they were doing before the call arrived. After the caller has left a complete message, as indicated by the caller terminating the call or after a predetermined recording time period, the IAM system 124 downloads the recorded message to the subscriber's computer terminal 110 and updates the Client application's call log, which lists the calls handled by the IAM system 124 for the called party. The message is archived in the MS subsystem 138 and is also available locally on the computer terminal 110 for playback at the called party's convenience.

Under option (2), the called party may decide to pickup the call in progress to talk to the calling party using the computer terminal 110. Having screened the call, the called party can signal the IAM system 124 to indicate a desire to talk to the calling party using VoIP. For example, the called party can activate the "HOME PC (VoIP)" option displayed in FIG. 3. After the called party has selected option (2), the Client application 116 sends an instruction by way of an Internet-based client/server control message to the IAM system 124. Upon receiving the instruction, the IAM system 124 interrupts the recording and streaming process and plays a canned audio prompt to the calling party. The audio prompt can be, for example, "please hold while your call is being connected," followed by audible ringing. The IAM system 124 then bridges, in full duplex mode, the inbound call from the calling party to the CM subsystem 108 with the outbound VoIP call from the CM subsystem 108 to the called party computer 110.

The IAM system 124 will stay bridged between the calling party and called party for the duration of the call and may respond to internal events or called party actions. For example, the IAM system 124 can selectively interrupt the bridged call if a time limit is exceeded and play an announcement to notify the calling party and/or the called party that the call will be terminated shortly. The IAM system 124 can also initiate or transmit a warning message directly to the Client application 116 that then displays a visual notice regarding call termination or the like on the called party's computer terminal 110.

FIGS. 4A-4B illustrate an example call process workflow that can be used when a called party is online and can answer screened calls via a VoIP session. In this example, after screening the call, the called party agrees to talk directly to the caller. Of course, after screening the call the called party could have elected to decline the call. With reference to FIGS. 4A-4B, at state 401, the calling party phone 102 (hereinafter, referred to as the "calling party") calls the called party phone line 114 connected to the telephone 112 and computer 110. In this example, the computer 110 is using the phone line 114 to access the Internet; i.e. the computer is online and hence the phone line is busy.

At state 402, the PSTN 104 detects that the called party phone line 114 is busy. At state 403, in accordance with a call forwarding service, the PSTN 104 forwards the call on busy to the IAM system 124 via the voice trunk circuits 118. At state 404, the IAM system 124 transmits an incoming call alert to the computer 110 that is displayed to the called party by the Client application 116. At the same time or shortly thereafter, at state 405 the IAM system 124 answers the forwarded incoming call. At state 406, the PSTN 104 establishes a full duplex, 2-way talk path with the calling party. At state 407, the IAM system 124 plays a greeting to the calling party. At state 408, the calling party optionally begins leaving a voice message that is recorded by the IAM system 124. Alternatively, similar to a telephone answering machine, the calling party can begin speaking to the called party even while the IAM system 124 is playing the greeting. At state 409 the IAM system 124 begins streaming the message being left by the calling party in substantially real-time to the Client application 116 or other media player executing on the computer 110, that then plays the message to the called party.

At state 410 of FIGS. 4A-4B, the IAM system 124 generates a tone or other audio signal to indicate to the calling party that the calling party should begin recording a message. At state 411, the calling party begins leaving a voice message. At state 412, the IAM system 124 begins streaming the message being left by the calling party in substantially real-time to the Client application 116 or other media player executing on the computer 110, which plays the message to the called party.

At state 413, the called party notifies the IAM system 124 that the called party wants to take the call. At state 414, the IAM system 124 interrupts the calling party, via a tone or voice notification. At state 415, the IAM system 124 requests that the calling party hold or wait while the IAM system 124 connects the calling party to the called party. At state 416, the IAM system 124 bridges the calling party with the called party computer 110, via the VoIP software module 130, by establishing a VoIP session. This entails bridging the two calls together through the IAM system so that the caller and the called party can converse (state 417):

the inbound call from the calling party 102 connected into the CM subsystem 108 through the PSTN 104; is bridged with the outbound call from the CM subsystem 108 connected through the Router subsystem 140 and the Internet 106 to the VoIP session running on the subscriber's computer terminal 110.

Either party can terminate the call at state 418 by hanging up their telephone (calling party station set 102, or the called party can terminate the VoIP session on the computer terminal 110). At state 419, the IAM system 124 releases the bridging resources and signals completion of the call by sending a corresponding control message to the called party which is either displayed or played to the called party via the Client application 116.

In another embodiment, the SM subsystem 122 detects the presence of the called party on different IP devices, such as other computers or web-enabled cellular phones, at other locations. For example, the session manager SM subsystem 122 optionally interfaces with other instant messaging services, such as:

AOL®'s Instant Messenger™
MSN®'s Instant Messenger™
Yahoo!® Messenger,
ICQ where presence of the called party can be detected on other IP networks and at other geographic locations. The same call/session dialog described above is similarly performed in this embodiment.

Under option (3), the called party may decide to pickup the call in progress to talk to the calling party via a POTS telephone, such as the telephone terminal 112. Having screened the call, the called party can signal the IAM system 124 to indicate a desire to talk to the calling party. If the called party activates, by way of example, the "TALK @ HOME" key illustrated in FIG. 3 with the Home Phone radio button depressed, the Client application 116 sends an instruction to the IAM system 124 and then substantially immediately terminates the called party's dial-up Internet session in order to make available the called party's phone line 114. Upon receiving the instruction from the Client application 116, the IAM system 124 interrupts the recording and streaming process and plays a canned voice prompt, such as "please hold while your call is being connected," followed by audible ringing. The IAM system 124 then proceeds to originate a new call on a free outbound voice trunk 118 from the IAM system 124 to the called party's phone line 114. The call from the IAM system 124 to the called party can be a local, intra-state, inter-state, or International PSTN call, as needed. Optionally, the call originated by the IAM system 124 is to be jurisdictionally interstate so as to be rated and billed or charged as an interstate call. For example, in one embodiment, a six digit Information Element in the SS7 call setup message may be configured with the geographic area code and prefix of the Call Processing IAM System 124 so as to cause the rating of the outgoing call to be Inter-state rather than Intrastate.

When the called party's phone line 114 is answered a brief announcement is played to the called party and the IAM system 124 then bridges, in full duplex mode, the inbound call between the calling party and IAM system 124 with the outbound call between the IAM system 124 and called party's line 114.

In addition, the user can specify call handling rules that determine, at least in part, the call treatment for an incoming call based on one or more conditions. A rule can specify, for example, that if one or more conditions are met for a call, the call will be processing in accordance with a corresponding specified treatment. For example, the following conditions and automatic treatments can be defined:

Conditions:
Time-of-Day (can include a range of times), Day of Week (can include a range of days), Day of Year (holiday)
Calling Party Number (Caller ID, non-local area code, phone type, caller name)
Called Party Number
Subscriber presence (IP device)
Telephony presence (phone)
Treatments:
Take a voice message (using selective greeting(s))
Take the call on home PC
Take the call on home phone
Take the call on work phone
Take the call on another phone
Remote screen on another phone(s) or other device(s)
Block call (for example, using an audio message, a SIT tone or the like)
Do not answer call
Multiparty conference By way of example, a subscriber can specify that if a call from a specified calling party number is received at a specified time of day (8:00-5:00), during the work week (Monday-Friday), the call should be forwarded to a specified phone, which can be the subscriber's work phone. By way of another example, a subscriber can specify that if a call to a specified phone number associated with the subscriber is received, on a holiday, remote screening should be performed using a different one of the subscriber's phone numbers.

If the call treatment specifies that the caller is to be connected to the subscriber using a given device, the subscriber can optionally still be provided with the ability to manually specify further call treatment, such as similarly described above. For example, the called party can be presented with one or more of the following options: take a voice message (using selective greeting(s)); take the call on home PC; take the call on home phone; take the call on office phone; take the call on another phone; remote screen on another phone(s) or other device(s); block call; do not answer call. Depending on the device the subscriber is currently using, the options can be provided via a visual menu, a voice menu, or the like.

Figure 5A:
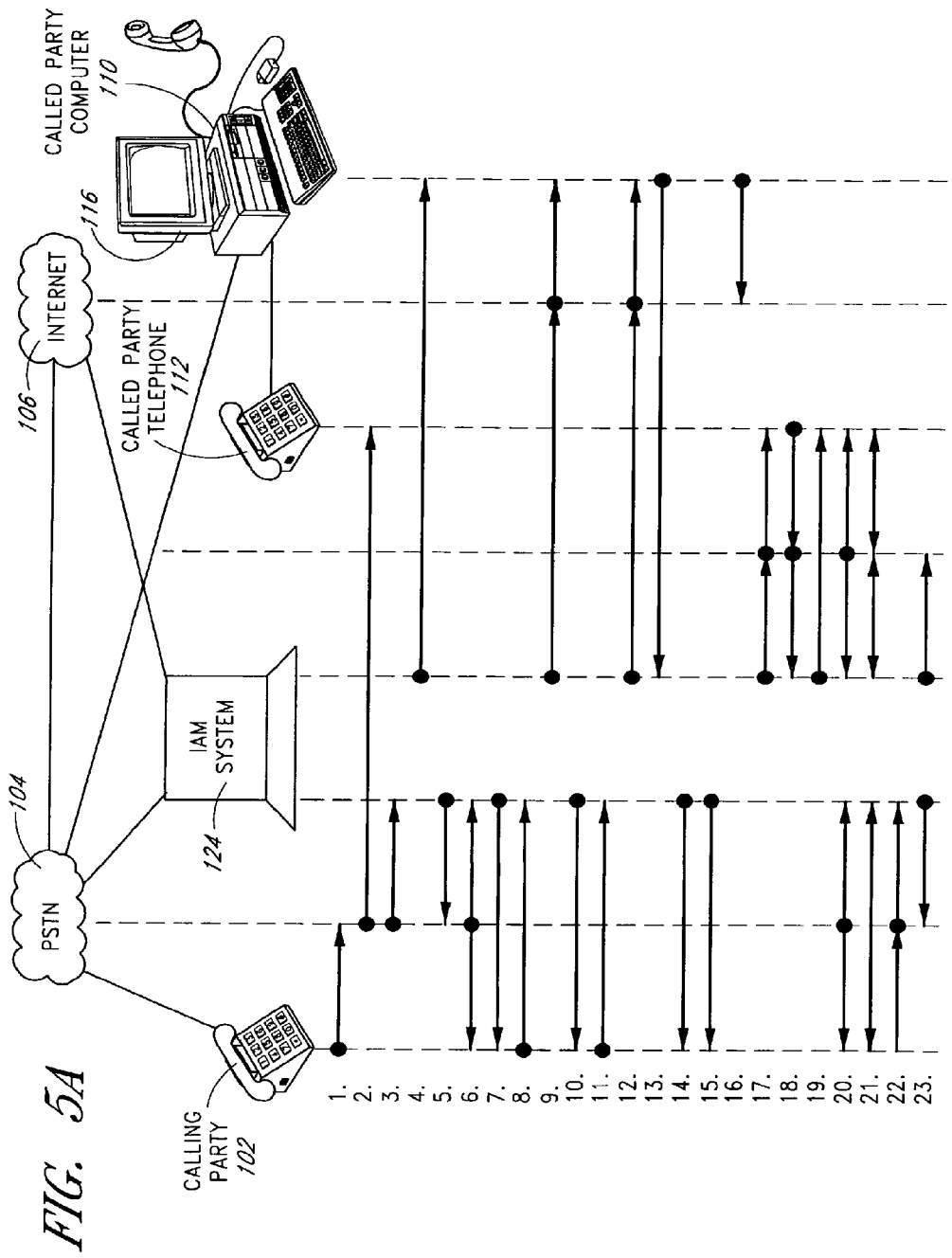

FIGS. 5A-5B illustrate an example call process workflow that can be used when a called party requests to interrupt the caller message and to talk to the caller using the home telephone. With reference to FIGS. 5A-5B, at state 501, the calling party calls the called party phone line 114 connected to the telephone 112 and computer 110. In this example, the computer 110 is using the phone line 114 to access the Internet or other computer network, and so is online. At state 502, the PSTN 104 detects that the called party phone line 114 is busy. At state 503, in accordance with a call forwarding service, the PSTN 104 forwards the call on busy to the IAM system 124 via the voice trunk circuits 118. At state 504, the IAM system 124 transmits an incoming call alert to the computer 110 that is displayed to the called party by the Client application 116. At the same time or shortly thereafter, at state 505 the IAM system 124 answers the forwarded incoming call. At state 506, the PSTN 104 establishes a full duplex, 2-way talk path with the calling party. At state 507, the IAM system 124 plays a greeting to the calling party. At state 508, the calling party optionally begins leaving a voice message that is recorded by the IAM system 124. Once again, the calling party can begin speaking to the called party even while the IAM system 124 is playing the greeting. At state 509 the IAM system 124 begins streaming the message being left by the calling party in substantially real-time to the Client application 116 or other media player executing on the computer 110, that then plays the message to the called party.

At state 510 of FIGS. 4A-4B, the IAM system 124 generates a tone or audible signal to indicate to the calling party that the calling party should begin recording a message. At state 511, the calling party begins leaving a voice message. At state 512, the IAM system 124 begins streaming the message being left by the calling party in substantially real-time to the Client application 116 or other media player executing on the computer 110, which plays the message to the called party.

At state 513, the called party notifies the IAM system 124 that the called party wants to take the call via the home telephone 112, and the IAM system 124 instructs the Client application 116 to terminate the online session of the computer 110 by disconnecting from the Internet 106. At state 514, the IAM system 124 interrupts the calling party, via a tone or voice prompt. At state 515, the IAM system 124 requests that the calling party hold or wait while the IAM system 124 connects the called party to the called party. At state 516, the Client application 116 terminates the online session of the computer 110 by disconnecting from the Internet 106 thereby idling the called party's telephone line 114. At state 517, the IAM system 124 initiates a new call to the called party phone 112. At state 518, the called party answers the new incoming call from the IAM system 124. At state 519, the IAM system 124 generates a call announcement to the called and/or calling party. At state 520, the IAM system 124 bridges the call between the calling party phone 102 and the called party phone 112. The calling and called parties can now conduct a normal telephone conversation at state 521. Again, either party can terminate the call by simply hanging up their telephone (state 522). At state 523, the IAM system 124 then releases the bridging resources and terminates the remaining call by optionally notifying the calling/called party that the other party has hung up and then disconnecting the call.

Under option (4), the called party may decide to pickup the call in progress to talk to the calling party using a communications device other than the telephone terminal 112 or the computer 110. Having screened the call, the called party signals the IAM system 124 by, for example, activating the "TALK REMOTELY" button option illustrated in FIG. 3, to indicate a desire to talk to the calling party. As similarly discussed above with respect to option (3), based on the called party selecting option (4), the Client application 116 sends a corresponding instruction to the IAM system 124 along with a specification of the desired destination station phone number. The destination number specification can be an index into the subscriber's electronic phone book or may literally be the desired destination phone number. For example, the called party can select via the "Would you like to TALK to this caller" option that the called party wants to talk to the calling party using the called party's cell phone, office phone, other phone, or at a phone associated with a phone number entered by the called party in the "ENTER PHONE #" field.

Upon receiving the instruction from the Client application 116, the IAM system 124 interrupts the recording and streaming process and plays a voice prompt to the caller. The IAM system 124 then proceeds to originate a new call on a free outbound voice trunk circuit 118. In contrast to option (3) described above, the Client application 116 does not terminate the online Internet session of the subscriber's computer terminal 110. In fact, the Client application 116 may continue online call monitoring operation while the above described transferred call is in progress. Multiple subsequent inbound calls could be simultaneously handled in this manner.

By way of example and not limitation, the destination station of the outbound call from the IAM system 124 can include:

a wireless or cellular phone or device;

a called party's phone line and/or extension at work;

another POTS line of the called party (e.g. a second home phone number); or a neighbor's or friend's phone line.

In addition, the called party can optionally specify the destination station by manually entering a phone number while the call is being screened. This new entry could be automatically journaled in an electric phone book available to the Client application 116 or an extension to the options menu could popup to query the subscriber to determine if this is desired. Alternatively, the called party selecting an existing entry from the phone book can optionally dynamically assign the destination station. The phone book entries can be persistently stored locally on the computer terminal 110, in a centralized medium like the IAM DB subsystem 136, or in both.

Under option (5), the called party may decide to allow the call in progress to be remotely screened using a communications device other than the telephone terminal 112 or the computer 110. This can optionally be in addition to continued screening of this call on the subscriber's computer 110 or instead of continued screening of this call on the subscriber's computer 110. The called party signals the IAM system 124, using the "SCREEN REMOTELY" option illustrated in FIG. 3, to indicate a desire to remotely screen the incoming call. Once again, as similarly discussed with respect to options (3) and (4) above, based on the called party selecting option (5), the Client application 116 sends a corresponding instruction to the IAM system 124 along with a specification of the desired destination phone number. The destination number selection and specification is identical to that utilized in option (4) above, however the Screen Remotely options are used, rather than the Talk Remotely options. For example, the called party can select via the "Would you like to SCREEN to this caller" option that the called party wants to screen the calling party using the called party's cell phone, office phone, other phone, or at a phone associated with a phone number entered by the called party in the "ENTER PHONE #" field.

Upon receipt of this instruction, the IAM system 124 initiates an outbound call from the CM subsystem to the specified destination phone number. The call setup signaling information for this outbound call is modified by the IAM system 124 to deliver the calling party number from the inbound call in the outbound call's ANI field. This allows the forwarded destination station to display the "original Caller-ID" to use as a first level filter for remotely screening the call. Should the remote called party decide to ignore this call, they simply do not answer it and the IAM system 124 will abort the transferred call attempt after a programmable time interval or a programmable number of ring cycles.

If the remote called party answers the transferred call, the IAM system 124 plays a brief greeting prompt to the remote party to announce the remote screening call in progress. The caller message streaming can start at the beginning of the recording or cut over to live recording in real time. The output talk path from the remote party back to the IAM system 124 is active but is muted with respect to the original calling party call. This allows the remote party to monitor the inbound call without the original calling party knowing that they are doing so. If the remote party decides to pickup the call in progress to talk to the calling party, they instruct the IAM system 124 to bridge the two calls together by depressing a DTMF key or by uttering a voice command. Upon receiving this instruction, the IAM system 124 interrupts the recording and streaming process and plays a canned audio prompt to the calling party. Once again, the audio prompt can be, for example, "please hold while your call is being connected," followed by audible ringing. The IAM system 124 then bridges, in full duplex mode, the inbound call from the calling party to the CM subsystem 108 with the outbound call from the CM subsystem 108 to the remote called party station.

Once again, the IAM system 124 will stay bridged between the calling party and remote called party for the duration of the call and may respond to internal events or called party actions. For example, the IAM system 124 can selectively interrupt the bridged call if a time limit is exceeded and play an announcement to notify the calling party and/or the remote called party that the call will be terminated shortly. The IAM system 124 can also transmit a warning message (such as a short text message) over the Internet 106 to the remote station set that then displays a visual notice regarding call termination or the like.

Under option (6), the called party may decide to not accept calls from the calling party. Having screened the call, the called party can signal the IAM system 124 to abort the caller's message recording and to communicate the request to not be called in the future. For example, the called party can activate the "BLOCK CALL" option illustrated in FIG. 3. The called party can either select a do not answer option or a "Tell them to TAKE ME OFF their list" option. As in the cases above, based on a user action the Client application 116 sends a corresponding instruction to the IAM system 124. Upon receiving the "Tell them to TAKE ME OFF their list" instruction from the Client application 116, the IAM system 124 interrupts the recording and streaming process, plays a voice prompt to the caller, such as: "The person you have called does not accept solicitations, please remove this phone number from your calling list. Thank you and goodbye." The IAM system 124 then disconnects the call. The options dialog box could pop an additional query to determine if the subscriber would like the IAM system 124 to always apply this treatment to future calls from this Calling phone number. This automatic call handling rule would be stored in a table of subscriber preference settings local to the IAM system 124 (for example in a simple extension table of the subscriber's phone book). If directed to do so, the IAM system 124 would automatically screen-out future calls from this caller and not "bother" the subscriber with needing to handle them.

Option (7) is a variant of option (6). The called party can monitor the Caller-ID of the incoming call and decide to not accept calls from this calling party. The IAM system 124 could be optionally configured to delay answering the incoming call for a fixed time interval or for a specific number of ring cycles in order to allow the subscriber time to review the Caller-ID. If the Client application 116 instructs the IAM system 124 to block the call in this manner before the incoming call has been answered, the IAM system 124 will ignore the call (i.e. let it ring). If the Client application 116 instruction comes after the incoming call has been answered, the IAM system 124 will apply the call treatment described above for option (6). Alternatively, the IAM system 124 could be configured to instead default to a standard Internet answering call when the Client application 116 instruction comes after the incoming call has already been answered. Once again, the options dialog box could pop an additional query to determine if the subscriber would like the IAM system 124 to always apply this treatment to future calls from this Calling phone number. Again, these automatic call handling rules would be stored in the IAM system 124 and, when directed to do so, the IAM system 124 would automatically screen-out future calls from this caller and not "bother" the subscriber with needing to handle them.

The above scenarios describe situations in which the called party's computer 110 is on-line and serves as the initial IAM call screening device. Alternatively, the IAM system 124 could be configured to automatically forward the call notification announcement and streamed caller message to an alternate device such as a POTS or wireless telephone or another online IP device. This alternative call screening device selection could be configured to vary based on the availability of the online presence of the called party's computer 110 or alternate IP devices, on the Caller-ID of the calling party 102, on the dialed number for the Called party 112, on the reason that the call was directed to the IAM system 124 (for example, call forwarding on busy, ring-no-answer, or do-not-disturb conditions), on time of day, day of week, etc. Configuration rules governing the automatic call handling treatment can be stored in the IAM DB subsystem 136.

The following process describes a typical IAM call screening scenario when the called party's computer 110 is offline. When the called number forwards on busy, ring-no-answer, or do-not-disturb, and arrives on one of the IAM voice trunks 118 along with the signaling information, the CM subsystem queries the SM subsystem 122 and/or the IAM DB subsystem 136 using the incoming call's OCN (the original called party number) to determine that the call is for a registered subscriber, to determine the subscriber's online/offline presence status, and to retrieve that subscriber's call handling preference rules. Assuming that the subscriber has previously configured the account to handle diverted offline calls, the IAM system carries out the specified call handling treatment. This could be simply to answer the call and take a message. Alternatively, it could include one of the seven call management options previously described. For example, the subscriber may have specified that automatic remote call screening on their cell phone was desired when their home computer 110 was not online. In this case, the CM subsystem 108 originates another call to the destination device, based on the previously described configuration rules. Additionally, the CM subsystem 108 may optionally delay answering the incoming calling party's call for a predetermined amount of time or number of rings. This gives the called party additional time to answer the call originated from the CM subsystem 108.

Normally, when the IAM system 124 originates a call, the calling party ID passed in the SS7 and/or ISDN-PRI trunk signaling is the calling party ID of the trunks originating the call. In one embodiment, the CM subsystem 108 modifies the network signaling to replace the calling party ID of the trunks to be that of the phone number of the original calling party. Thus, a Caller-ID device will advantageously display the phone number of the original calling party. The call is processed in an analogous above described fashion for handling a remote screening call forwarded by the subscriber from the online computer 110 to a wireless station. If the called party answers the call, the IAM system 124 plays a brief announcement of the call to the subscriber and the inbound call is answered by the IAM system 124 (if not already answered due to timeout reasons). For example, the CM subsystem 108 might announce the call as "This is an Internet Answering Machine call for John Doe". The IAM system 124 then bridges the inbound calling party call with the outbound called party call. The IAM system 124 optionally mutes the return talk path to prevent sound traveling back to the calling party so that the calling party is unaware that their call is being screened. Preferably, though not required, the called party is bridged onto the call as the called party is either listening to a personal/system greeting or, as the calling party is beginning to leave a message for the called party. In this manner, the called party can further screen the call.

Once the called party begins to screen the call, the called party may decide not to connect to the calling party. The called party, having screened the caller who is in the process of leaving a message, can hang up, thereby terminating the bridged call without the calling party being aware that the screening process took place. The calling party can continue to leave a message for the called party after the bridged call is terminated. Alternatively, the called party may decide to pickup the incoming call to talk to the calling party. Having screened the calling party, the called party can signal the CM subsystem 108, by entering a touch-tone signal or providing a voice command, to indicate a desire to talk to the calling party. The IAM system 124 will then bridge in full duplex mode the call between the calling party and CM subsystem 108 with the call between the CM subsystem 108 and called party.

The IAM system 124 will stay bridged between the calling party and called party. The IAM system 124 can selectively interrupt the bridged call if a predetermined time limit is reached and play an announcement to the calling and/or the called party that the call will be terminated shortly. Optionally, this announcement will only be played to the called party. In another case, the IAM system 124 can selectively interrupt the bridged calls to announce to the called party that the call will be terminating unless the called party authorizes billing by entering a touch-tone command or by providing a verbal authorization to charge the called party's telephone number or a credit card.

In another embodiment, an external bridging system (hardware and/or software), including a connecting switch, is used to bridge calls. The CM subsystem 108 can instruct the connecting switch located within the PSTN 104 equipped with the call bridging system to create a 3-party conference call between the calling party, the called party, and the IAM system. This process advantageously reduces the number of voice ports needed on the IAM system 124. In this scenario, the called party can optionally signal the switch with touch-tone or voice commands to cause the IAM system 124 to connect back into the bridged call.

The example embodiments described above referred to calls forwarded from a called party's line. Another embodiment uses a personal number uniquely assigned to each subscriber by which calls to that number can be screened. The personal number can be, for example a telephone number that has been acquired through governmental telephone number administration bodies, provisioned in the PSTN network, assigned to the IAM system 124 and registered to an individual subscriber.

The personal number call screening process will now be described. A calling party 102 at a phone dials a phone number published by a subscriber to the IAM system 124. The call routes through the PSTN 104 and terminates on the IAM voice trunk 118 along with its associated call signaling information. Thus, for example, rather than using an existing wireless or POTs phone number, a subscriber can publish a private phone number, wherein all calls to the private phone number undergo an automatic screening process, as previously described. This technique enables the subscriber to better manage their incoming call costs.

Using the called party personal phone number or normal phone number as a search key or index, the IAM system 124 extracts or retrieves call treatment actions and conditions stored in association with the called party personal number or normal phone number. The call treatment conditions and actions can include some or all of those described above. For example, the conditions can include one or more of:

Time-of-Day (can include a range of times), Day of Week (can include a range of days), Day of Year (holiday)
Calling Party Number (Caller ID, non-local area code, phone type, caller name)
Called Party Number
Subscriber presence (IP device)
Telephony presence (phone)
The call treatments can include one or more of:
Take a voice message (using selective greeting(s))
Take the call on computer
Take the call on POTS phone (specify home, work, other POTS phone)
Take the call on a wireless phone
Remote screen on another phone(s) or other device(s)
Block call (for example, using an audio message, a SIT tone or the like)
Do not answer call
Multiparty conference The following is a more detailed description of example call treatment actions that can be executed or orchestrated by the IAM system 124:

Do not answer action: the incoming calling party phone number is screened against a list of phone numbers or subscriber-specified other criteria (such as no caller id available), wherein if the calling phone number matches the listed phone numbers and/or the other criteria, the incoming call is not answered;

Take call on computer (online/offline status action): if the called party is online when a call is received, initiate a VoIP session with the Client application 116 running on the subscriber's IP device 110 and screen the call as described above;

Take the call on POTS phone action: originate a call to a specified POTS line and bridge the POTS call with remote screening as described above;

Take the call on POTS phone action: originate a call to a wireless phone action and bridge the wireless call with remote screening as described above; or multi-party conference action: in which the call screening session described above is broadcast to multiple phones and IP Clients substantially at the same time.

In one embodiment, the multi-party conference action can include the following states. A first call processing apparatus, such as the IAM system 124, receives a call from a first user for a second user. A voice communication from the first user is received at the first call processing apparatus. At least a portion of the voice communication is multicasted to a plurality of client devices, which can include for example POTs, wireless, cellular and/or VoIP phone devices, at substantially the same time so that the first user's call can be screened. An instruction is received via a first of the plurality of client devices to connect the first user to a first of the plurality of client devices. The second user is then bridged to the first of the plurality of client devices.

In another embodiment, the multi-party conference action can include the following states. A first call processing apparatus, such as the IAM system 124, receives a call from a first user for a second user. A call alert is then multicasted to a plurality of client devices, which can include for example POTs, wireless, cellular and/or VoIP phone devices, at substantially the same time so that the first user's call can be screened. In addition, a voice communication received from the first user can be multicasted to the plurality of client devices at substantially the same time. The call alert can include at least a portion of Caller ID information associated with the first call. An instruction can then be received via a first of the plurality of client devices to connect the first user to a first of the plurality of client devices. The second user's call is then bridged to the first of the plurality of client devices.

Thus, as described above, embodiments of the present invention provide flexible, user definable call screening processes that can advantageously optionally be used even when the user is online. Further embodiments advantageously enable the user to define to which telecommunication terminals the screened call is to be broadcast to and under what conditions.

It should be understood that certain variations and modifications of this invention would suggest themselves to one of ordinary skill in the art. The scope of the present invention is not to be limited by the illustrations or the foregoing descriptions thereof.

What is claimed is:

1. A method of providing call connections, the method comprising:
    registering, by a computing system comprising a computing device and a network interface, a unique phone number to a user wherein the unique phone number is not a wireless phone number of the user and the unique phone number is not a wireline phone number of the user;
    receiving, at the computing system, an online presence indication of an Internet-connected computing device associated with the user; and
    at least partly in response to receiving the online presence indication of the Internet-connected computing device, enabling an incoming call to the unique phone number to be connected to the Internet-connected computing device associated with the user.

2. The method as defined in claim 1, wherein the receipt of the online presence indication of the Internet-connected computing device is based at least in part on a receipt of a data transmission from a software application installed thereon.

3. The method as defined in claim 1, wherein the receipt of the online presence indication of the Internet-connected computing device is performed using an Internet-based messaging service.

4. The method as defined in claim 1, wherein incoming calls to the unique phone number are directed to the computing system prior to being connected to the Internet-connected computing device associated with the user.

5. The method as defined in claim 1, the method further comprising enabling the user and a calling party associated with the incoming call to communicate over the connection.

6. The method as defined in claim 1, the method further comprising providing for display in association with a presentation of the incoming call a caller identification of a calling party, wherein the caller identification of the calling party is based at least in part on call signaling information associated with the incoming call.

7. The method as defined in claim 1, the method further comprising enabling the user to screen the incoming call by playing audio from a caller of the incoming call, without the caller being able to hear the user, via a user interface of an application software program installed on the Internet-connected computing device.

8. The method as defined in claim 7, the method further comprising enabling the user to direct the incoming call, subsequent to the initiation of the playing of the audio, to an alternative telephonic device of the user via the user interface of the application software program.

9. The method as defined in claim 1, the method further comprising enabling the user to direct the incoming call to an alternative telephonic device of the user via a user interface of an application software program installed on the Internet-connected computing device.

10. The method as defined in claim 1, wherein the Internet-connected computing device comprises a web-enabled cellular phone.

11. A system, comprising:
    at least one network-based server comprising hardware;
    at least one network interface;
    a router subsystem, which serves as an interface to the Internet to manage communications between online Internet Protocol client devices and the network-based server; and
    non-transitory memory, coupled to the network-based server, that stores instructions that when executed by the network-based server cause, at least in part, the system to perform operations comprising:
        recording a unique phone number assigned to a user wherein the unique phone number is not a wireless phone number of the user and the unique phone number is not a wireline phone number of the user;
        receiving an online presence indication of an Internet-connected computing device associated with the user; and
        at least partly in response to receiving the online presence indication of the Internet-connected computing device, enabling an incoming call to the unique phone number to be connected to the Internet-connected computing device associated with the user.

12. The system as defined in claim 11, wherein the receipt of the online presence indication of the Internet-connected computing device is based at least in part on a receipt of a data transmission from an application software program installed thereon.

13. The system as defined in claim 1, wherein the receipt of the online presence indication of the Internet-connected computing device uses at least in part an Internet-based messaging service.

14. The system as defined in claim 11, wherein incoming calls to the unique phone number are directed to the computing system prior to being connected to the Internet-connected computing device associated with the user.

15. The system as defined in claim 11, the operations further comprising enabling the user and a calling party associated with the incoming call to communicate over the connection.

16. The system as defined in claim 11, the operations further comprising providing for display in association with a presentation of the incoming call a caller identification of a calling party, wherein the caller identification of the calling party is based at least in part on call signaling information associated with the incoming call.

17. The system as defined in claim 11, the operations further comprising enabling the user to screen the incoming call by playing audio from a caller of the incoming call, without the caller being able to hear the user, via a user interface of an application software program installed on the Internet-connected computing device.

18. The system as defined in claim 17, the operations further comprising enabling the user to direct the incoming call, subsequent to the initiation of the playing of the audio, to an alternative telephonic device of the user via the user interface of the application software program.

19. The system as defined in claim 11, the operations further comprising enabling the user to direct the incoming call to an alternative telephonic device of the user via a user interface of an application software program installed on the Internet-connected computing device.

20. The system as defined in claim 11, wherein the Internet-connected computing device comprises a web-enabled cellular phone.

21. A system, comprising:
at least one network-based server comprising hardware;
at least one network interface;
a router subsystem, which serves as an interface to the Internet to manage communications between online Internet Protocol client devices and the network-based server; and
non-transitory memory, coupled to the network-based server, that stores instructions that when executed by the network-based server cause, at least in part, the system to perform operations comprising:
recording a unique phone number of a user in an account associated with the user, wherein the unique phone number is not a wireless phone number of the user and the unique phone number is not a wireline phone number of the user;
receiving an online presence indication of an Internet-connected computing device associated with the user; and
at least partly in response to receiving a selection of a control via a user interface of an application software program installed on the Internet computing device, enabling an incoming call to the unique phone number to be connected to the Internet-connected computing device associated with the user.

22. The system as defined in claim 21, wherein the receipt of the online presence indication of the Internet-connected computing device is based at least in part on a receipt of a data transmission from the application software program.

23. The system as defined in claim 21, wherein the receipt of the online presence indication of the Internet-connected computing device uses at least in part an Internet-based messaging service.

24. The system as defined in claim 21, wherein incoming calls to the unique phone number are directed to the computing system prior to being connected to the Internet-connected computing device associated with the user.

25. The system as defined in claim 21, the operations further comprising enabling the user and a calling party associated with the incoming call to communicate using the Internet-connected computing device.

26. The system as defined in claim 21, the operations further comprising providing for display in association with a presentation of the incoming call a caller identification of a calling party, wherein the caller identification of the calling party is based at least in part on call signaling information associated with the incoming call.

27. The system as defined in claim 21, the operations further comprising enabling the user to screen the incoming call by playing audio from a caller of the incoming call, without the caller being able to hear the user, via the user interface of the application software program.

28. The system as defined in claim 27, the operations further comprising enabling the user to direct the incoming call, subsequent to the initiation of the playing of the audio, to one or more telephonic devices of the user via the user interface of the application software program.

29. The system as defined in claim 21, the operations further comprising enabling the user to direct the incoming call to one or more telephonic devices of the user via the user interface of the application software program.

30. The system as defined in claim 29, wherein the one or more telephonic devices comprises a landline phone or a cellular phone capable computing device.

* * * * *